United States Patent
Bundalo et al.

(10) Patent No.: US 11,189,273 B2
(45) Date of Patent: Nov. 30, 2021

(54) HANDS FREE ALWAYS ON NEAR FIELD WAKEWORD SOLUTION

(71) Applicant: Amazon Technologies, Inc., Seattle, WA (US)

(72) Inventors: Marko Bundalo, San Jose, CA (US); Dibyendu Nandy, San Ramon, CA (US); Bhupal Kanaiyalal Dharia, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 584 days.

(21) Appl. No.: 15/637,658

(22) Filed: Jun. 29, 2017

(65) Prior Publication Data
US 2019/0005953 A1  Jan. 3, 2019

(51) Int. Cl.
*G10L 21/00* (2013.01)
*G10L 25/00* (2013.01)
(Continued)

(52) U.S. Cl.
CPC ............ *G10L 15/22* (2013.01); *G06F 1/3203* (2013.01); *G06F 1/3287* (2013.01); *G10L 15/26* (2013.01); *G10L 15/28* (2013.01); *G10L 25/78* (2013.01); *G10L 2015/088* (2013.01); *G10L 2015/223* (2013.01); *G10L 2025/783* (2013.01)

(58) Field of Classification Search
CPC .... G06F 1/3206; G06F 1/3215; G06F 1/3268; G06F 3/0659; H04M 2250/74; G10L 15/22; G10L 17/22; G10L 2015/223; G10L 15/02; G10L 15/30; G10L 15/32; G10L 2015/088; G10L 2015/226; G10L 25/78; G10L 2025/783; G10L 25/15; G10L 25/18; G10L 25/84

See application file for complete search history.

(56) References Cited

U.S. PATENT DOCUMENTS 6,070,140 A  5/2000 Tran
9,368,105 B1 *  6/2016 Freed .................. G10L 15/22
(Continued)

FOREIGN PATENT DOCUMENTS

WO  2014159581  2/2014

OTHER PUBLICATIONS

Wilpon, L.R Rabiner, C.H Lee, E.R Goldman "Automatic recognition of keywords in unconstrained speech using hidden Markov models", IEEE Trans. Acoust. Speech Signal Process., 38 (11) (1990), pp. 1870-1878.*

(Continued)

*Primary Examiner* — Michael Ortiz-Sanchez
(74) *Attorney, Agent, or Firm* — Pierce Atwood LLP

(57) ABSTRACT

Apparatuses and systems for conserving power for a portable electronic device that monitors local audio for a wakeword are described herein. In a non-limiting embodiment, a portable electronic device may have two-phases. The first phase may be a first circuit that stores an audio input while determining whether human speech is present in the audio input. The second phase may be a second circuit that activates when the first circuit determines that human speech is present in the audio input. The second circuit may receive the audio input from the first circuit, store the audio input, and determine whether a wakeword is present within the audio input.

18 Claims, 8 Drawing Sheets

(51) Int. Cl.
*G10L 15/22* (2006.01)
*G10L 15/28* (2013.01)
*G06F 1/3203* (2019.01)
*G06F 1/3287* (2019.01)
*G10L 15/26* (2006.01)
*G10L 25/78* (2013.01)
*G10L 15/08* (2006.01)

(56) References Cited

U.S. PATENT DOCUMENTS

| | | | |
|---|---|---|---|
| 9,613,626 B2 | 4/2017 | Chen et al. | |
| 2002/0061012 A1* | 5/2002 | Thi | H04B 3/23 370/352 |
| 2002/0188445 A1* | 12/2002 | Li | G10L 25/78 704/233 |
| 2014/0163978 A1* | 6/2014 | Basye | G10L 15/28 704/233 |
| 2014/0222436 A1 | 7/2014 | Binder et al. | |
| 2014/0274203 A1* | 9/2014 | Ganong, III | H04W 52/0251 455/556.1 |
| 2014/0281628 A1* | 9/2014 | Nigam | G06F 1/3206 713/323 |
| 2015/0043755 A1* | 2/2015 | Furst | H04R 3/00 381/114 |
| 2015/0245154 A1* | 8/2015 | Dadu | G06F 3/167 381/56 |
| 2015/0356982 A1* | 12/2015 | Chesney | G10L 25/84 704/275 |
| 2016/0019933 A1* | 1/2016 | Sime | G11B 27/28 386/243 |
| 2016/0253997 A1 | 1/2016 | Kerr | |
| 2017/0133041 A1* | 5/2017 | Mortensen | G10L 25/18 |
| 2018/0174583 A1* | 6/2018 | Zhao | G10L 15/22 |

OTHER PUBLICATIONS

International Search Report and Written Opinion for Application No. PCT/US2018/039465, dated Sep. 27, 2018.
International Preliminary Report on Patentability dated Jan. 9, 2020 in PCT/US2018/039465.

* cited by examiner

HANDS FREE ALWAYS ON NEAR FIELD WAKEWORD SOLUTION

BACKGROUND

Some electronic devices, such as voice activated electronic devices, are portable electronic devices. Most portable electronic devices benefit from energy saving solutions to extend the operable life of the devices without being recharged.

DETAILED DESCRIPTION

Figure 1A:
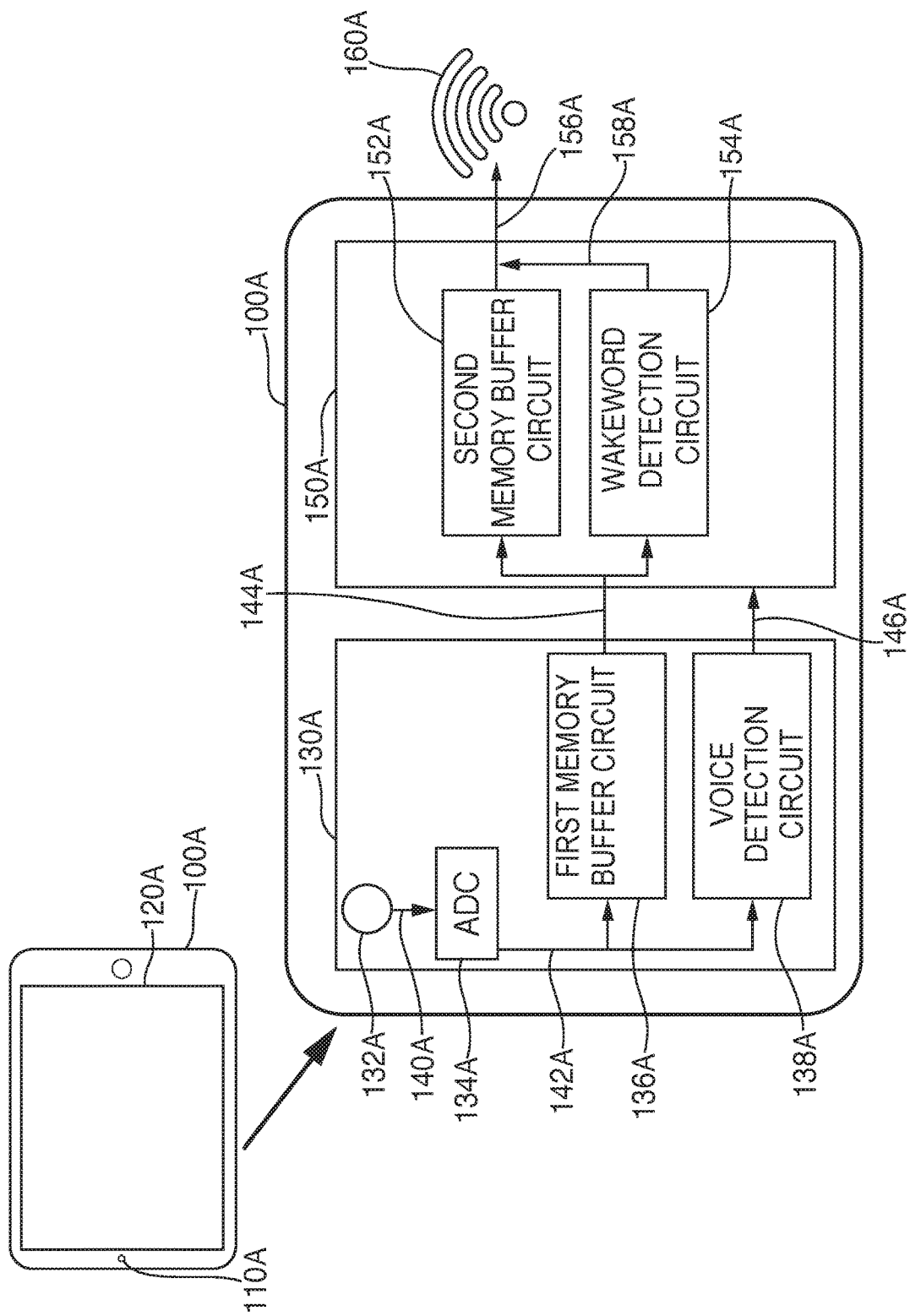
FIG. 1A is an illustrative diagram of an exemplary portable electronic device having a two-phase wakeword solution in accordance with various embodiments.

The present disclosure, as set forth below, is generally directed to various embodiments of apparatuses, systems, and methods that provide a two-phase wakeword solution to conserve energy for portable electronic devices. In particular, portable electronic devices may listen for a wakeword when the portable electronic devices are operating in a standby mode. A standby mode may be characterized as a mode of operation where the portable electronic device reduces and/or eliminates power to subsystems within the portable electronic device that are not needed when the device is not being used. For example, the portable electronic device could shut off power to the display screen when the device is not in use. The portable electronic device could also reduce the level of activity of the on-device processors (such as reducing the clock speed or number of cores that are fully-operational) at times of inactivity to save power.

Generally, the purpose of a standby mode is to conserve power. In order to conserve power in standby mode, while still listening for the wakeword, the portable electronic device may have a two-phase solution, as described in some embodiments. For example, in some embodiments, a first phase of operation may be a low power circuit that accepts audio inputs through a microphone and circuitry to try to detect the presence of human voice in the received audio signal. The low power circuit may include an analog-to-digital converter (ADC) circuit, a memory buffer circuit, and a voice detection circuit (sometimes referred to as a voice activity detector, or VAD). In some embodiments, the ADC may receive an analog audio input signal from the microphone, which it converts into a digital audio signal representative of the received analog audio signal. The digital audio signal is then output to both the memory buffer circuit and the voice detection circuit, which may each receive the digital audio signal. The voice detection circuit attempts to determine whether a human voice signal is present in the sound received by the microphone. If the voice detection circuit determines that a human voice is present, the voice detection circuit may output a switch signal that indicates a human voice was detected. If the voice detection circuit determines that a human voice is not present, the portable electronic device remains in standby mode.

In some embodiments, the second phase may be a medium powered circuit that also operates in standby mode. The medium powered circuit may have an activation circuit that activates the medium powered circuit when an interrupt signal is received from the low power circuit. In some embodiments, the interrupt signal may be, for example, the switch signal output by the voice detection circuit. Once activated, in some embodiments, the medium powered circuit may receive the digital audio signal from the low power circuit. In particular, a second memory buffer circuit and a wakeword detection circuit, both of which are resident in the medium powered circuit, may receive the digital audio signal from the first memory buffer circuit. The wakeword detection circuit may analyze the digital audio signal to determine whether a wakeword is present. If the wakeword detection circuit determines that a wakeword is present in the digital audio signal, the wakeword detection circuit may provide an additional switch signal that may lead to the portable electronic device becoming fully active and then connecting with a language processing system. Moreover, if the wakeword detection circuit determines a wakeword is present, the second memory buffer circuit may output the digital signal for further processing. In some embodiments, this digital audio signal may be output to the language processing system. If the wakeword detection circuit determines that a wakeword is not present, in some embodiments, the medium powered circuit may remain in standby mode and the low power circuit may return to standby mode.

In some embodiments, the first phase may itself have two components or sub-phases. In these embodiments, the low power circuit may have an analog-to-digital converter (ADC), two memory buffer circuits, a voice detection circuit (or VAD), and a pre-wakeword detection circuit. In some embodiments, the first sub-phase may be similar to the first phase described above. As such, the first sub-phase may have an ADC receive an analog audio input signal from a microphone. After the ADC converts the analog audio input signal into a digital signal, both the first memory buffer circuit, and the voice detection circuit (VAD) may receive the digital audio signal. The voice detection circuit can determine whether the sound heard by the microphone contains, for example, human voice. If the voice detection circuit determines that human voice is present, the voice detection circuit may output a switch signal. Additionally, if it is determined that human voice is present, the first memory buffer circuit may output the digital audio signal. Similar to the description above, if the voice detection circuit determines that human voice is not present, the portable electronic device remains in standby mode.

The second sub-phase may involve a pre-wakeword memory buffer circuit and a pre-wakeword detection circuit. The second sub-phase may activate when a switch signal is received from the voice detection circuit (VAD). Once activated, the pre-wakeword memory buffer circuit and the pre-wakeword detection circuit may receive the digital audio signal from the first memory buffer circuit in the first sub-phase. The pre-wakeword detection circuit, in some embodiments, may then analyze the digital audio signal to evaluate the likelihood that a wakeword is present in the digital audio signal. If the likelihood that a wakeword is present in the digital audio signal is beyond a predetermined threshold, the pre-wakeword detection circuit may output an additional switch signal to activate the medium powered circuit.

This pre-determined threshold can be set so that the pre-wakeword detection circuit acts as a filter to block digital audio signals in which the wakeword cannot be present, and to pass on digital audio signals in which the wakeword can be present. Thus, the pre-wakeword detection circuit is not actually determining whether a wakeword is present, but is instead determining whether a wakeword can be present in the received audio signal. This technique can be utilized to decrease the amount of false activations while at the same time increasing the overall accuracy of wakeword detection. Thus, if the determined likelihood is above a predetermined threshold, the pre-wakeword memory buffer circuit can output the digital audio signal to the medium powered circuit. Similar to the description above, if the pre-wakeword detection circuit determines the likelihood a wakeword is present is below a predetermined threshold, the portable electronic device can remain in standby mode. In some embodiments, the pre-wakeword detection circuit can provide an interrupt signal that activates the medium powered circuit (for example, a signal to an activation circuit that can power up the medium powered circuit).

As used herein, "switch signal" can be as simple as applying a signal to close a switch or a current to the base or gate of a transistor that is acting as a switch. A switch signal may also be an interrupt signal that more complex circuitry would receive and act accordingly.

As used herein, the term "wakeword" may correspond to a "keyword" or "key phrase," an "activation word" or "activation words," or a "trigger," "trigger word," or "trigger expression." One exemplary wakeword may be a name, such as the name, "Alexa," however any word (e.g., "Amazon"), or series of words (e.g., "Wake Up" or "Hello, Alexa") may alternatively be used as the wakeword. Furthermore, the wakeword may be set or programmed by an individual operating a voice activated electronic device, and in some embodiments more than one wakeword (e.g., two or more different wakewords) may be available to activate a voice activated electronic device. In yet another embodiment, the trigger that is used to activate a voice activated device may be any series of temporally related sounds.

As used herein, the term "utterance" may correspond to a spoken word, statement, or sound. In some embodiments, an utterance may include the wakeword followed by an invocation, such as a request, question, or command. In this particular instance, the utterance may begin with the wakeword being spoken, and may end when a last word, phoneme, or sound is spoken. For example, an utterance may correspond to the question, "Alexa—What is the weather currently like?" As another example, an utterance may be, "Alexa—Play my workout music," or "Alexa—Buy that." Further still, an utterance, which need not include the wakeword, may be, "Turn up the volume" or "Call mom."

Another type of sound controlled electronic device may be a sound activated electronic device. Such sound activated electronic device may function similarly to voice activated electronic devices, except that, for sound activated electronic devices, the trigger may be a non-verbal sound. For example, the sound of a door opening, an alarm going off, glass breaking, a telephone ringing, or any other sound may alternatively be used to activate a sound controlled electronic device. In this particular scenario, detection of a non-verbal sound may occur in a substantially similar manner as that of a verbal wakeword for a voice activated electronic device. For example, the sound of a door opening, when detected, may activate a sound activated electronic device, which in turn may activate a burglar alarm.

In some embodiments, the electronic device may additionally, or alternatively, correspond to a manually activated electronic device. A manually activated electronic device, as described herein, may correspond to a device that is capable of being activated in response to a manual input from an individual (e.g., pressing a button, touching a portion of a touch screen, performing an action on a device). For example, a tap-to-talk device is one type of manually activated device. Such tap-to-talk devices, for instance, are capable of obtaining and outputting audio data in response to a button being pressed by an individual. In some embodiments, a sound controlled electronic device (e.g., a voice activated electronic device and/or a sound activated electronic device) may include manual activated functionality such that an individual may interact with the device using voice (e.g., speech prefaced by a wakeword), sound (e.g., a particular trigger sound), and/or a manual input (e.g., a button press, a touch of a screen, etc.). However, in some embodiments, an electronic device may be configured to include a single activation functionality (e.g., only voice activated, or only manually activated).

FIG. 1A is an illustrative diagram of an exemplary portable electronic device having a two-phase wakeword solution in accordance with various embodiments. Portable electronic device 100A may correspond to any suitable type of electronic device including, but are not limited to, mobile computers (e.g., laptops, ultrabooks), mobile phones, smart phones, tablets, televisions, set top boxes, smart televisions, personal display devices, personal digital assistants ("PDAs"), gaming consoles and/or devices, smart furniture, smart vehicles (e.g., cars, trucks, motorcycles, etc.), smart transportation devices (e.g., boats, ships, trains, airplanes, etc.), wearable devices (e.g., watches, pins/broaches, headphones, etc.), and/or smart accessories (e.g., light bulbs, light switches, electrical switches, etc.). In some embodiments, portable electronic device 100A may be relatively simple or basic in structure such that no, or a minimal number of, mechanical input option(s) (e.g., keyboard, mouse, track pad) or touch input(s) (e.g., touch screen, buttons) are included. For example, portable electronic device 100A may be able to receive and output audio, and may include power, processing capabilities, storage/memory capabilities, and communication capabilities. However, in other embodiments, portable electronic device 100A may include one or more components for receiving mechanical inputs or touch inputs, such as a touch screen and/or one or more buttons.

In the non-limiting embodiment, portable electronic device 100A may include camera 110A and display screen 120A. Camera 110A may be any device that can record visual images in the form of photographs, film, or video signals. In one exemplary, non-limiting embodiment, camera 110A is a digital camera that encodes digital images and videos digitally and stores them on local or cloud-based memory. Camera 110A may, in some embodiments, be configured to capture photographs, sequences of photographs, rapid shots (e.g., multiple photographs captured sequentially during a relatively small temporal duration), videos, or any other type of image, or any combination thereof. In some embodiments, electronic device(s) 10 and/or 100 may include multiple camera 110A, such as one or more front-facing cameras and/or one or more rear facing cameras. Furthermore, camera 110A may be configured to recognize far-field imagery (e.g., objects located at a large distance away from portable electronic device 100A) or near-filed imagery (e.g., objected located at a relatively small distance from portable electronic device 100A). In some embodiments, camera 110A may be high-definition ("HD") cameras, capable of obtaining images and/or videos at a substantially large resolution (e.g., 726p, 1080p, 1080i, etc.). In some embodiments, camera 110A may be optional for portable electronic device 100A. For instance, camera 110A may be external to, and in communication with, portable electronic device 100A. For example, an external camera may be capable of capturing images and/or video, which may then be provided to portable electronic device 100A for viewing and/or processing. In some embodiments, camera 110A may be multiple cameras.

Display screen 120A may be any device that can output data in a visual form. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display device including capacitive sensing panels capable of recognizing touch inputs thereon. For instance, display screen 120A may correspond to a projected capacitive touch ("PCT"), screen include one or more row traces and/or driving line traces, as well as one or more column traces and/or sensing lines. In some embodiments, display screen 120A may be an optional component for electronic device 100. For instance, portable electronic device 100A may not include display screen 120A. Such devices, sometimes referred to as "headless" devices, may output audio, or may be in communication with a display device for outputting viewable content.

Display screen 120A, in one non-limiting embodiment, may include an insulator portion, such as glass, coated with a transparent conductor, such as indium tin oxide ("InSnO" or "ITO"). In general, one side of the touch screen display may be coated with a conductive material. A voltage may be applied to the conductive material portion generating a uniform electric field. When a conductive object, such as a human finger, stylus, or any other conductive medium, contacts the non-conductive side, typically an outer surface of display screen 120A, a capacitance between the object and the conductive material may be formed. Processor(s) 202 may be capable of determining a location of the touch screen associated with where the capacitance change is detected, and may register a touch input as occurring at that location.

In some embodiments, display screen 120A may include multiple layers, such as a top coating layer, a driving line layer, a sensing layer, and a glass substrate layer. As mentioned previously, the glass substrate layer may correspond to an insulator portion, while the top coating layer may be coated with one or more conductive materials. The driving line layer may include a number of driving lines, and the sensing layer may include a number of sensing lines, which are described in greater detail below. One or more additional layers, or spaces between layers, may be included. Furthermore, any number of driving lines and sensing lines for driving the line layer and the sensing layer, respectively, may be used.

In some embodiments, the driving lines and the sensing lines of the driving line layer and the sensing line layer, respectively, may form a number of intersection points, where each intersection functions as its own capacitor. Each sensing line may be coupled to a source, such that a charge is provided to each sensing line, and changes in capacitance of a particular driving line and sensing line are detectable thereby. In response to a conductive object being brought proximate, or substantially touching an outer surface of the top coating layer, a mutual capacitance of a particular capacitor (e.g., an intersection point) may reduce in magnitude. In other words, a voltage drop may be detected at a location on display screen 120A corresponding to where a conductive object contacted display screen 120A.

A change in capacitance may be measured to determine a location on the touch screen where the object has contacted the surface. For example, if an individual touches a point on display screen 120A, then a corresponding driving line and sensing line that intersect at that point may be identified. A location of the point may have one or more pixels associated with that location, and therefore one or more actions may be registered for an item or items that are displayed at that location. For example, in some embodiments, portable electronic device 100A may have one or more processors. In this embodiment, the one or more processors of portable electronic device 100A may be configured to determine which pixels are associated with a particular location point, and which item or items are also displayed at that pixel location. Processors are discussed in greater detail below in connection with FIG. 2A in regards to processor(s) 202, the same description applying herein.

Portable electronic device 100A may also be configured to cause one or more additional actions to occur to the item or items being displayed on display screen 120A based on a temporal duration the touch input, and or if one or more additional touch inputs are detected. For example, an object that contacted display screen 120A at a first location may be determined, at a later point in time, to contact display screen 120A at a second location. In the illustrative example, an object may have initially contacted display screen 120A at the first location and moved along a particular driving line to the second location. In this scenario, a same driving line may have detected a change in capacitance between the two locations, corresponding to two separate sensing lines.

The number of driving lines and sensing lines, and therefore the number of intersection points, may directly correlate to a "resolution" of a touch screen. For instance, the greater the number of intersection points (e.g., a greater number of driving lines and sensing lines), the greater precision of the touch input. For instance, a touch screen display screen 120A having 100 driving lines and 100 sensing lines may have 100 intersection points, and therefore 100 individual capacitors, while a touch screen display screen 120A having 10 driving lines and 10 sensing lines may only have 10 intersection points, and therefore 10 individual capacitors. Therefore, a resolution of the touch screen having 100 intersection points may be greater than a resolution of the touch screen having 10 intersection points. In other words, the touch screen having 100 intersection points may be able to resolve a location of an object touching the touch screen with greater precision than the touch screen having 10 intersection points. However, because the driving lines and sensing lines require a voltage to be applied to them, this may also mean that there is a larger amount of power drawn by portable electronic device 100A, and therefore the fewer driving lines and/or sensing lines used, the smaller the amount of power that is needed to operate the touch screen display.

In some embodiments, display screen 120A may be a display that can output content. Examples of content can be, but are not limited to, text, 3GP files, Adobe files, Graphics Interchange Format files (GIF), JPEG files, JPG files, MPEG files, MPEG Audio files, MPEG Video files, movies, and images. This list is not limiting or exhaustive. The above examples of content is a non-exhaustive list is written merely for exemplary purposes and that any type of content may be displayed on display screen 120A. In some embodiments, display screen 120A receives light from one or more LED lights.

In some embodiments, display screen 120A may correspond to a high-definition ("HD") display. For example, display screen 120A may display images and/or videos of 720p, 1080p, 1080i, or any other image resolution. In these particular scenarios, display screen 120A may include a pixel array configured to display images of one or more resolutions. For instance, a 720p display may present a 1024 by 768, 1280 by 720, or 1366 by 768 image having 786,432; 921,600; or 1,049,088 pixels, respectively. Furthermore, a 1080p or 1080i display may present a 1920 pixel by 1080 pixel image having 2,073,600 pixels. However, the aforementioned display ratios and pixel numbers are merely exemplary, and any suitable display resolution or pixel number may be employed for display screen 120A, such as non-HD displays, 4K displays, and/or ultra displays.

In some embodiments, display screen 120A and/or camera 110A may be optional for portable electronic device 100A. For instance, portable electronic device 100A may function using audio inputs, and outputting audio in response or causing one or more actions to occur in response, and therefore display screen 120A and/or camera 110A may not be included. Furthermore, in some embodiments, portable electronic device 100A may not include display screen 120A and/or camera 110A, but instead may be in communication with display screen 120A and/or camera 110A. For example, portable electronic device 100A may be connected to a display screen via a Wi-Fi (e.g., 802.11 protocol) connection such that visual content sent to portable electronic device 100A may be sent to the display screen, and output thereby. Similarly, camera 110A may be optional for portable electronic device 100A.

In one exemplary embodiment, portable electronic device 100A may include an additional input/output ("I/O") interface. For example, portable electronic device 100A may include one or more input components capable of receiving user inputs. Various types of input components may include, but are not limited to, keyboards, buttons, switches, a mouse, joysticks, or an external controller may be used as an input mechanism for the I/O interface. In some embodiments, the output portion of the I/O interface of portable electronic device 100A may include one or more lights, light emitting diodes ("LEDs"), or other visual indicator(s). In some embodiments, one or more features of the output portion of the I/O interface may be included in a purely voice activated version of portable electronic device 100A. For example, one or more LED lights may be included on portable electronic device 100A such that, when microphone(s) 132A receive audio, the one or more LED lights become illuminated signifying that audio has been received by portable electronic device 100A. In some embodiments, one or more vibrating mechanisms or other haptic features may be included with portable electronic device 100A to provide a haptic response to an individual.

In some embodiments, portable electronic device 100A may include radiofrequency identification ("RFID") functionality and/or near field communication ("NFC") functionality. Furthermore, in some embodiments, portable electronic device 100A may include one or more infrared ("IR") sensors and one or more IR emitters. The IR sensors/emitters may be used to determine depth information. For example, in one embodiment, a distance of an individual from portable electronic device 100A may be determined using the one or more IR sensors/emitters. Depth determination may be performed using any depth determination technique. In some embodiments, a distance between an individual and portable electronic device 100A may be employed as a basis for presenting content with varying density using display screen 120A. In some embodiments, portable electronic device 100A may include beaconing functionality that allows portable electronic device 100A to recognize when one or more devices are located nearby. For example, portable electronic device 100A may include beaconing detection functionality that generates a beaconing signal, and attempts to determine whether any devices nearby are capable of detecting that signal. If so, then that may indicate that a particular device is proximate to portable electronic device 100A.

Portable electronic device 100A may include first circuit 130A, second circuit 150A and microphone(s) 132A. First circuit 130A may include analog-to-digital converter ("ADC") 134A, first memory buffer circuit 136A, and voice detection circuit 138A. Second circuit 150A may include second memory buffer circuit 152A and wakeword detection circuit 154A. One or more additional components may be included within portable electronic device 100A, and/or one or more components may be omitted. For example, portable electronic device 100A may also include, one or more batteries (not shown), one or more processors, storage/memory, communications circuitry, and/or one or more speakers. One or more batteries may include, but are not limited to, a lithium ion battery, a nickel cadmium batter, a nickel-metal hydride battery, a lithium polymer battery, and lead acid battery. This list is not exhaustive and one or more batteries may include any battery capable of powering portable electronic device 100A. A more detailed description of one or more processors, storage/memory, communications circuitry, and one or more speakers is located below in connection with the description of FIG. 2A, the same descriptions applying herein. In some embodiments, portable electronic device 100A may be in standby mode. In some embodiments, standby mode may refer to a state of portable electronic device 100A where power is cut from unneeded subsystems and portable electronic device 100A's random access memory ("RAM") is put in a minimum power state. In some embodiments, this minimum power state may be a power state sufficient to retain the data of portable electronic device 100A. Standby mode, in some embodiments, may result in display screen 120A of portable electronic device 100A being off. Standby mode may also include low power sleep state, sleep mode, suspend mode, suspend to ram mode, hybrid sleep mode, and hibernation mode. This list is merely exemplary and any low power mode for electronic devices may be included in standby mode.

In some embodiments, when portable electronic device 100A is in standby mode, first circuit 130A may still be active. Active, in some embodiments, may refer to a mode where the operation of the electronics are operating at a power state above standby mode. However, while active, in some embodiments, first circuit 130A may be implemented as a very low power circuit that utilizes a minimal amount of power from portable electronic device 100A. In some embodiments, second circuit 150A may operate in standby mode while first circuit 130A is active. While portable electronic device 100A is operating in standby mode, microphone(s) 132A may be activated in order to monitor the local environment for the presence of audio signals. In some embodiments, this monitoring may occur continuously. Microphone(s) 132A may be implemented as one or more microphones or through the use of any other suitable audio input devices.

Once audio signals are monitored, microphone(s) 132A may provide an analog audio output 140A to ADC 134A. ADC 134, may be any circuitry that can convert an analog signal into a digital signal. Once the audio input signal is received and converted from an analog signal to a digital signal, in some embodiments, the digital signal may be output 142A from ADC 134A to first memory buffer circuit 136A and voice detection circuit 138A. In some embodiments, microphone(s) 132A may be a digital microphone. In these embodiments, microphone(s) 132A may have its own ADC, thus making ADC 134A redundant and unnecessary. In some embodiments a digital microphone may, instead, have a delta modulator that can convert a mixed signal from an analog input signal to a digital input signal. Additionally, portable electronic device 100A may have a decimator that can reside on first circuit 130A, which, in some embodiments, may convert the remainder of the analog signal from an analog signal to a digital signal.

In some embodiments, first memory buffer circuit 136A may store the digital audio signal received from ADC 134A. First memory buffer circuit 136A, in some embodiments may be a physical memory storage that temporarily stores data. This temporary storage may allow voice detection circuit 138A to determine whether human speech is present in the digital audio signal before first memory buffer circuit 136A outputs the received digital audio signal. For example, first memory buffer circuit 136A may temporarily store the received digital audio signal for 25 ms to 3000 ms. This range is merely exemplary and any range could be used in order to output the received digital audio signal when voice detection circuit 138A determines that human voice is present in the digital audio signal. In some embodiments, first memory buffer circuit 136A may output the received digital audio signal in a first-in-first-out method (or FIFO, where the received digital audio signals are output in the order they were received). Once voice detection circuit 138A has determined that human speech is present within the received digital audio signal, in some embodiments, first memory buffer circuit 136A may output 144A the received digital audio signals to second circuit 150A. In some embodiments, first memory buffer circuit 136A may continuously output the received digital audio signals to second circuit 150A, which may ignore those signals until an interrupt signal 146A is received from voice detection circuit 138A. Interrupt signal 146A could be coupled to a switch (not shown) that essentially activates second circuit 150A only when the presence of human voice is likely to exist in the received audio signals (e.g., the analysis of the received digital audio signal should determine that the likelihood that human voice is present in the digital audio signal exceeds a predetermined threshold) Alternatively, interrupt signal 146A could be supplied directly to power control circuitry (not shown) within second circuit 150A that could operate to wake second circuit 150A from standby mode when received. The size of first memory buffer circuit 136A can determine how much digital audio can be stored therein. For example, 200 k of memory might be able to store 3000 milliseconds of audio, while 400 k of memory might be able to store 6000 milliseconds of audio.

First memory buffer circuit 136A, in some embodiments, may include one or more types of storage mediums such as any volatile or non-volatile memory implemented in any suitable manner to store data for portable electronic device 100A. Various types of storage/memory may include, but are not limited to flash memory, permanent memory (e.g., ROM), electronically erasable programmable read-only memory ("EEPROM"), or any other storage type, or any combination thereof.

In some embodiments, once the digital audio signal is received, voice detection circuit 138A will analyze the digital audio signal to determine the likelihood that a digital representation of a human voice is present in the audio signals. Once voice detection circuit 138A determines that the likelihood of human speech being present has exceeded a predetermined threshold (e.g., a likelihood greater than 90%), voice detection circuit 138A can then output an interrupt signal 146A that causes second circuit 150A to go from standby mode to active mode. In some embodiments, voice detection circuit 138A may first reduce the noise within the received digital audio signal. Voice detection circuit 138A may then analyze the digital audio signal by calculating features of the digital audio signal and/or amplitude of the digital audio signal by taking a portion of the digital audio signal and analyzing that portion. The features and/or quantities that can be analyzed can include, but are not limited to, frequency, amplitude, pitch, and tone. This list is not exhaustive and is merely exemplary. If certain features of the audio signal, such as amplitude, exceed predetermined thresholds, voice detection circuit 138A may determine that human voice is present. If, for example, the pitch of the audio signal is too low, or the pace of the audio signal is too slow, then voice detection circuit 138A may determine that it is not likely enough that human voice is present, and will not output interrupt signal 146A. In some embodiments, voice detection circuit 138A may use speech codec to assist in the analysis of the digital audio signal. In some embodiments, voice detection circuit 138A may be implemented in hardware. In some embodiments, voice detection circuit 138A may utilize one or more processors to perform its analysis. In some embodiments, voice detection circuit 138A may utilize pre-stored frequency profiles of various examples of human speech in order to achieve a higher degree of confidence in its analysis. Accordingly, voice detection circuit 138A can control the flow of audio from first circuit 130A (which can always be active) to second circuit 150A (which may be operating in a power reserving standby mode). For example, if the incoming audio signal received by microphone(s) 132A is of a HVAC system, automobile and road noise, or other similar stationary and quasi-stationary noise, voice detection circuit 138A would not output interrupt signal 146, and therefore, the audio signal would not be received by second circuit 150A. However, if the likelihood that human speech is present exceeds a predetermined, the audio signal would be received by both second memory buffer circuit 152A and wakeword detection circuit 154A once interrupt signal 146A causes second circuit 150A to move into active mode from standby mode. If, however, voice detection circuit 138A does not determine the presence of a human voice within the received audio signal (above a predetermined likelihood, for example), voice detection circuit 138A may not send interrupt signal 146A to second circuit 150A. Under those circumstances, without a strong enough likelihood that human voice is present within the received digital audio signal, second circuit 150A, and portable electronic device 100A may remain inactive and in standby mode.

In some embodiments, voice detection circuit 138A may be a low power sound detection unit. In these embodiments, voice detection circuit 138A may analyze the digital signal to determine the likelihood a digital representation of a specific sound is present. For example, voice detection circuit 138A may searching for the sound of a human clapping. In this example, voice detection circuit 138A would analyze the digital signal to determine the likelihood that the sound of a human clapping is present in the digital signal. This could be accomplished, for example, by storing a sound profile of a human clapping and comparing the input sound to that profile. Given that every clap sound is likely to be at least slightly different, the resultant comparison could provide a value that represents the percentage of the two signals that matched, and the circuitry can be configured to assume a "match" occurs (i.e., that a clapping sound has been received) when that value exceeds a threshold (for example, 90% match may be a high enough confidence that a clap has occurred, albeit a different clap, but a clap nonetheless).

In some embodiments, second circuit 150A may include second memory buffer circuit 152A and wakeword detection circuit 154A. In some embodiments, second circuit 150A may be a medium powered circuit that remains in standby mode if portable electronic device 100A is in standby mode, unless interrupt 146A is received to cause second circuit 150A to switch to active mode. Second memory buffer circuit 152A may be similar to first memory buffer circuit 136A described above, and the same description applies herein. Once voice detection circuit 138A has determined that human speech is present in the received digital audio signal, in some embodiments, second memory buffer circuit 152A may receive the digital audio signal from first circuit 130A. Moreover, under certain circumstances, wakeword detection circuit 154A may also receive the digital audio signal.

Wakeword detection circuit 154A may analyze the digital audio signal to determine whether a digital representation of a wakeword is present (within a very high degree of certainty, such as 90% or 95%, in order to continue processing the utterance that normally follows a wakeword). If a wakeword is present within the digital audio signal, wakeword detection circuit 154A may output second interrupt signal 158A. Second interrupt signal 158A can be utilized to cause a communications session to be initiated between portable electronic device 100A and a speech processing system, such as speech processing system 200 described below. Such a communications session can be established utilizing communications circuitry that can connect with a speech-processing system utilizing a variety of communications protocols, such as Wi-Fi protocol 160A. These communication protocols can include, but are not limited to, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network protocol), infrared, BitTorrent, FTP, RTP, RTSP, SSH, and/or VOIP.

Furthermore, if a wakeword is present in the digital audio signal, wakeword detection circuit 154A may send an interrupt signal 158A that causes portable electronic device 100A to switch from standby mode to active mode. This may include, for example, turning on display screen 120A, activating additional processing circuitry, activating additional input/output circuitry, etc.

Wakeword detection circuit 154A may include an expression detector that can analyze digital audio signals (that were received as analog signals by microphone(s) 132A and converted to digital signals) to detect a wakeword, which generally may be a predefined word, phrase, or any other sound, or any series of temporally related sounds. Such an expression detector may be implemented, for example, using keyword spotting technology. A keyword spotter is a functional component or algorithm that evaluates audio signals to detect the presence of a predefined word or expression. Rather than producing a transcription of words that were identified, a keyword spotter can generate a true/false output (e.g., a logical I/O) to indicate whether or not the predefined word or expression was represented in the evaluated audio signal. In some embodiments, an expression detector may be configured to analyze the digital audio signal to produce a score indicative of the likelihood that the wakeword is represented within the audio signal received by microphone(s) 132A. The expression detector may then compare that score to a wakeword threshold to determine whether the wakeword will be declared as having been received.

In some embodiments, a keyword spotter may use simplified automatic speech recognition (ASR) techniques, which are described in more detail below in connection with FIG. 2A. For example, an expression detector may use a Hidden Markov Model ("HMM") recognizer that performs acoustic modeling of the audio signal and compares the HMM model of the audio signal to one or more reference HMM models that have been created by training for specific trigger expressions. An HMM model represents a word as a series of states. Generally, a portion of an audio signal is analyzed by comparing its HMM model to an HMM model of the trigger expression, yielding a feature score that represents the similarity of the audio signal model to the trigger expression model.

In practice, an HMM recognizer may produce multiple feature scores, corresponding to different features of the HMM models. An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, portable electronic device 100A may then begin transmitting the received audio signals to the speech-processing system for further processing (for example, to determine what was requested by the user and to respond to that request).

In some embodiments, wakeword detection circuit 154A may store voice biometric data associated with one or more individuals. For example, an individual that operates portable electronic device 100A may have a registered user account on a speech-processing system (e.g. within an accounts system). The speech processing system and accounts system described may be similar to speech processing system 200 and accounts system 268 described in connection with FIG. 2A (which is described below). In some embodiments, portable electronic device 100A may be associated with a group account, and various individuals may have user accounts that are operating under the rules and configurations of the group account. As an illustrative example, portable electronic device 100A may be associated with a first group account on the speech-processing system, the first group account being for a family that lives at a household where portable electronic device 100A is located. Each family member may also have a user account that is linked to the first group account (e.g., a parent, a child, etc.), and therefore each user account may obtain some or all of the rights of the first group account. For example, portable electronic device 100A may have a first group account on the speech-processing system registered to a particular family or group, and each of the parents and children of the family may have their own user account registered under the parent's registered account. In one illustrative embodiment, voice biometric data for each individual may be stored by that individual's corresponding user account. The voice biometric data, for instance, may correspond to a "voice print" or "voice model" of a particular individual, which may be a graphical representation of a person's voice including a frequency decomposition of that individual's voice.

In some embodiments, first circuit 130A and second circuit 150A may be implemented in hardware located on one or more silicon chips. In some embodiments, first circuit 130A and second circuit 150A may include one or more processors capable of performing the functions above (although the power requirements for such an implementation may be impractical for first circuit 130A, which is a low power circuit). These one or more processors may be similar to processor(s) 202 described in connection with FIG. 2A.

Figure 1B:
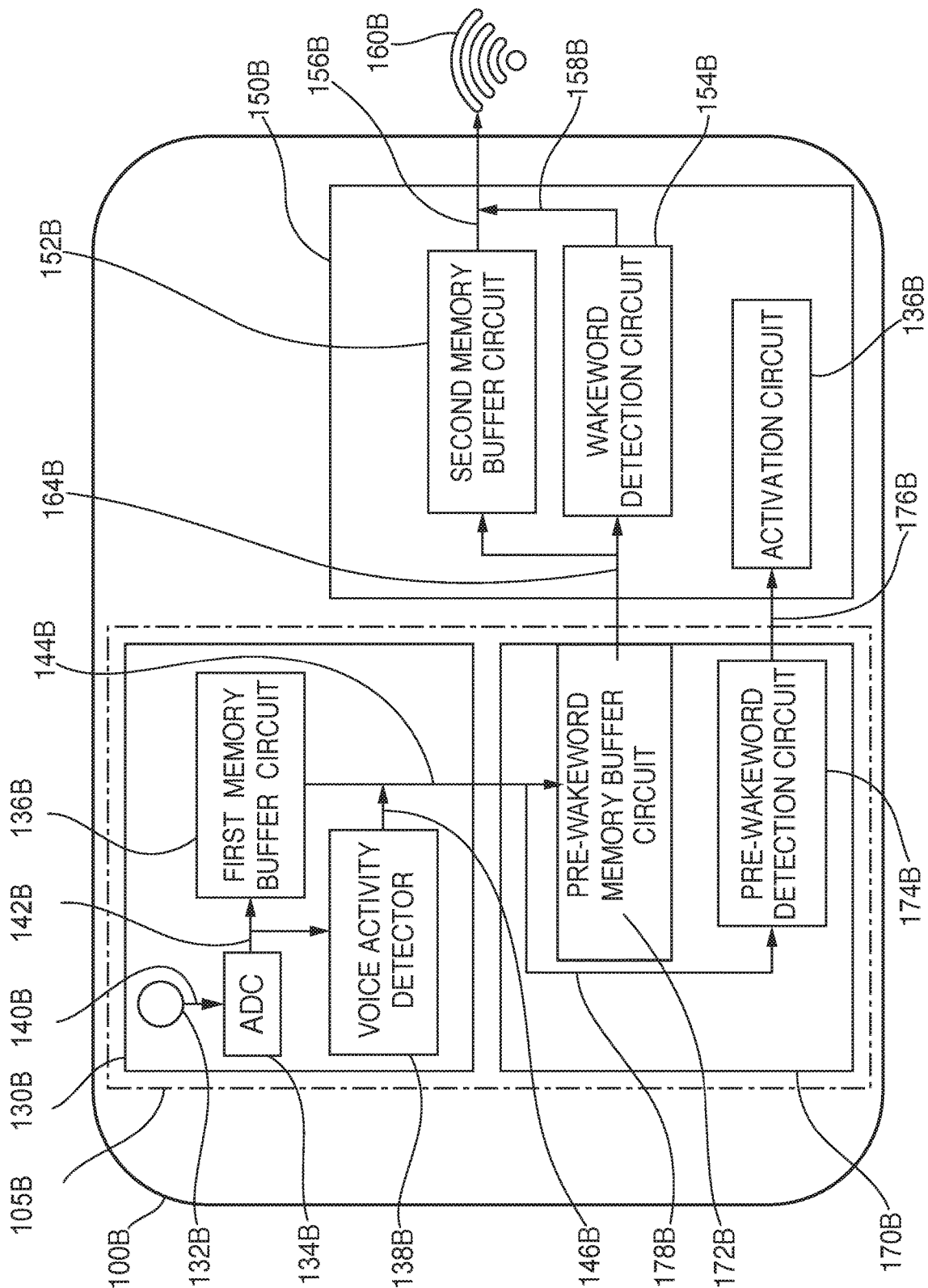
FIG. 1B is an illustrative diagram of another exemplary portable electronic device having a two-phase wakeword solution in accordance with various embodiments.

FIG. 1B is an illustrative diagram of another exemplary portable electronic device having a two-phase wakeword solution in accordance with various embodiments. Portable electronic device 100B may be similar to portable electronic device 100A described above in connection with FIG. 1A, and the same description applies here as well. Portable electronic device 100B may include first circuit 105B, second circuit 150B, and microphone(s) 132B. First circuit 105B may include two sub-circuits, a first sub-circuit 130B and second sub-circuit 170B. First sub-circuit 130B may include ADC 134B, first memory buffer circuit 136B, and voice activity detector 138B, which can all be substantially similar to circuit elements having the same name described above (e.g., ADC 134A and ADC 134B can be substantially similar, etc.). Second sub-circuit 170B may include pre-wakeword memory buffer circuit 172B and pre-wakeword detection circuit 174B. Second circuit 150B may include second memory buffer circuit 152B, wakeword detection circuit 154B and activation circuit 156B (all of which can be substantially similar to the circuit elements described above having the same names). One or more additional components may be included within portable electronic device 100B, and/or one or more components may be omitted. For example, portable electronic device 100B may also include, one or more batteries (not shown), one or more processors, storage/memory, communications circuitry, and/or one or more speakers. One or more batteries may include, but are not limited to, a lithium ion battery, a nickel cadmium batter, a nickel-metal hydride battery, a lithium polymer battery, and lead acid battery. This list is not exhaustive and one or more batteries may include any battery capable of powering portable electronic device 100B. A more detailed description of one or more processors, storage/memory, communications circuitry, and one or more speakers is located below in connection with the description of FIG. 2A, the same descriptions applying herein.

In some embodiments, portable electronic device 100B may, at times, operate in standby mode. When portable electronic device 100B is operating in standby mode, however, first circuit 105B may still be active. However, even though it is active first circuit 105B may be implemented as a very low power circuit, such that it consumes very little power from portable electronic device 100B. In some embodiments, first sub-circuit 130B can operate in active mode while second sub-circuit 170B is operating in standby mode (and while portable electronic device 100B is being operated in standby mode).

In some embodiments, while portable electronic device 100B is operating in standby mode, microphone(s) 132B may monitor local audio. In some embodiments, microphone(s) 132B may monitor the local environment for the presence of audio signals continuously. Microphone(s) 132B may be one or more microphones or any other suitable audio input devices. Microphone(s) 132B may be similar to microphone(s) 132A described in connection with FIG. 1A and the same description applies.

Once audio signals are monitored, microphone(s) 132B may provide an analog audio output 140B to ADC 134B. ADC 134B may convert the analog audio input signal to a digital audio signal. Once the audio input signal is received and converted from an analog signal to a digital signal, in some embodiments, the digital signal may be output 142B from ADC 134B to first memory buffer circuit 136B and voice activity detector 138B. ADC 134B may be similar to ADC 134A described above in connection with FIG. 1A and the same description applies herein.

In some embodiments, first memory buffer circuit 136B may store the digital audio signal received from ADC 134B. First memory buffer circuit 136B may be similar to first memory buffer circuit 136A described above in connection with FIG. 1A and the same description applies herein. Once the digital audio signal is received, the voice activity detector 138B may determine whether human speech is present within the received digital audio signal. Voice activity detector 138B may be similar to voice detection circuit 138A described above in connection with FIG. 1A, the same description applying herein.

Once a digital representation of human speech is present within the received digital audio signal first memory buffer circuit 136B may output 144B the received audio to second sub-circuit 120B. In some embodiments, first memory buffer circuit 136B may output the received audio in response to voice activity detector 138B outputting first switch signal 146B. In some embodiments, if voice activity detector 138B does not determine the presence of a human voice within the received digital audio signal, voice activity detector 138B may not output first switch signal 146B. In some embodiments, if voice activity detector 138B does not determine a human voice is present in the received audio, portable electronic device 100B may remain in standby mode.

In some embodiments, once the digital audio signal is received, voice activity detector 138B will analyze the digital audio signal to determine whether the digital audio signal includes a digital representation of human speech. If voice activity detector 138B determines human speech is present within the received audio, in some embodiments, voice activity detector 138B may output first switch signal 146B causing first memory buffer circuit 136B to output the received digital audio signal to the second sub-circuit 170B.

In some embodiments, second sub-circuit 170B may include pre-wakeword memory buffer circuit 172B and pre-wakeword detection circuit 174B. In some embodiments, second sub-circuit 170B may require more power than first sub-circuit 130B. To conserve power, in some embodiments, second sub-circuit 170B may be in standby mode until a switch signal is received by voice activity detector 138B. In these embodiments, the switch signal may alter second sub-circuit 170B's mode from standby mode to active mode.

In some embodiments, once voice activity detector 138B determines that human speech is present in the received audio, first memory buffer circuit 136B may output the received audio to pre-wakeword memory buffer circuit 172B and pre-wakeword detection circuit 174B. Pre-wakeword memory buffer circuit 172B may be similar to first memory buffer circuit 136A described above in connection with FIG. 1A and the same description applies herein. Once pre-wakeword detection circuit 174B has determined that the likelihood of the presence of a wakeword is above a predetermined threshold, in some embodiments, pre-wakeword memory buffer circuit 172B may output 164B the received audio to second circuit 150B. In some embodiments, if pre-wakeword detection circuit 174B does not determine that the likelihood of the presence of a wakeword is above a predetermined threshold, then pre-wakeword memory buffer circuit 172B may not output the received audio to the second circuit 150B.

Pre-wakeword detection circuit 174B, in some embodiments, may analyze the received audio to determine the likelihood that a digital representation of a wakeword is present in the received audio. This determined likelihood, in some embodiments, may be compared to a predetermined threshold. The pre-determined threshold can be set so that the pre-wakeword detection circuit acts as a filter to block digital audio signals in which the wakeword cannot be present, and to pass on digital audio signals in which the wakeword can be present. Thus, the pre-wakeword detection circuit is not actually determining whether a wakeword is present, but is instead determining whether a wakeword can be present in the received audio signal. This technique can be utilized to decrease the amount of false activations while at the same time increasing the overall accuracy of wakeword detection. A predetermined threshold, as used herein, may be any threshold, high or low. For example, if the wakeword is "Alexa" and the audio is "Hippopotamus," the likelihood that the audio file contains the word "Alexa" is very low. As another example, if the audio is "Alexandria," the likelihood that the audio file contains the word "Alexa" is relatively high and may exceed the predetermined threshold. Pre wakeword detection circuit 174B may be similar to wakeword detection circuit 154A described above in connection with FIG. 1A however, the pre wakeword detection circuit 174B analysis of the received digital audio signal may be far less robust.

In some embodiments, pre-wakeword detection circuit 174B may be a digital signal processor where the operational parameters can be adjusted to vary the predetermined threshold. The predetermined threshold can be varied to act like a filter that permits or blocks the passage of digital signals that may be a digital representation of a wakeword.

If the determined likelihood a wakeword is present in the digital audio signal exceeds the predetermined threshold pre wakeword detection circuit 174B may output second switch signal 176B to second circuit 150B. In some embodiments, switch signal 176B may be output to activation circuit 136B. Second switch signal 176B may activate second circuit 150B. Second switch signal 176B, in some embodiments, may be an IRQ. For example, pre wakeword detection circuit 174B may output an IRQ to activation circuit 136B, altering the mode of second circuit 150B from standby mode to active mode.

In some embodiments, second circuit 150B may include second memory buffer circuit 152B, wakeword detection circuit 154B and activation circuit 136B. In some embodiments, second circuit 150B may be a medium-powered circuit that is in standby mode if portable electronic device 100B is in standby mode. Second circuit 150B may, in some embodiments, operate in standby mode until activation circuit 136B activates second circuit 150B. Activation circuit, in some embodiments, may receive second switch signal 176B from pre wakeword detection circuit 174B. However, in some embodiments, activation circuit 136B may be omitted from second circuit 130B.

Once active, second memory buffer circuit 152B and wakeword detection circuit 154B may receive audio from pre-wakeword memory buffer circuit 172B in response to pre wakeword detection circuit 174B determining that the likelihood that a wakeword is present in the received audio exceeds a predetermined threshold. In some embodiments, second memory buffer circuit 152B may store the audio received from second memory buffer circuit 122B. Second memory buffer circuit 152B may be similar to first memory buffer circuit 136A described above in connection with FIG. 1A, and the same description applies herein. In some embodiments, second memory buffer circuit 152B may output the received audio in response to wakeword detection circuit 154B outputting third switch signal 158B. In some embodiments, if wakeword detection circuit 154B does not determine that a wakeword is present in the received audio, then second memory buffer circuit 152B may not output the received audio.

Wakeword detection circuit 154B, in some embodiments, may analyze the received audio to determine whether a wakeword is present within the received audio. Wakeword detection circuit 154B may be similar to wakeword detection circuit 154A described above in connection with FIG. 1A and the same description applies herein. If a wakeword is present within the received audio, wakeword detection circuit may output third switch signal 158B causing second memory buffer circuit 152B to output the received audio to communications circuitry (not shown). Communications circuitry, in some embodiments, may connect with a speech-processing system utilizing communication protocol 160B. Communications protocol 160B may be similar to communications protocol 160A described above in connection with FIG. 1A and the same description applies. The speech processing system may be similar to speech-processing system 200 discussed below in connection with FIG. 2A, and the same description applies herein.

Furthermore, in some embodiments, if a wakeword is present in the received audio, wakeword detection circuit 154B may send a signal that causes portable electronic device 100B's mode to switch from standby mode to active mode.

In some embodiments, first circuit 105B and second circuit 150 may be implemented in hardware located on one or more silicon chips. In some embodiments, first circuit 105B and second circuit 150B may include one or more processors capable of performing the functions above (although the power requirements for such an implementation may be impractical for first circuit 105B, which is a low power circuit). These one or more processors may be similar to processor(s) 202 described in connection with FIG. 2A.

Figure 2A:
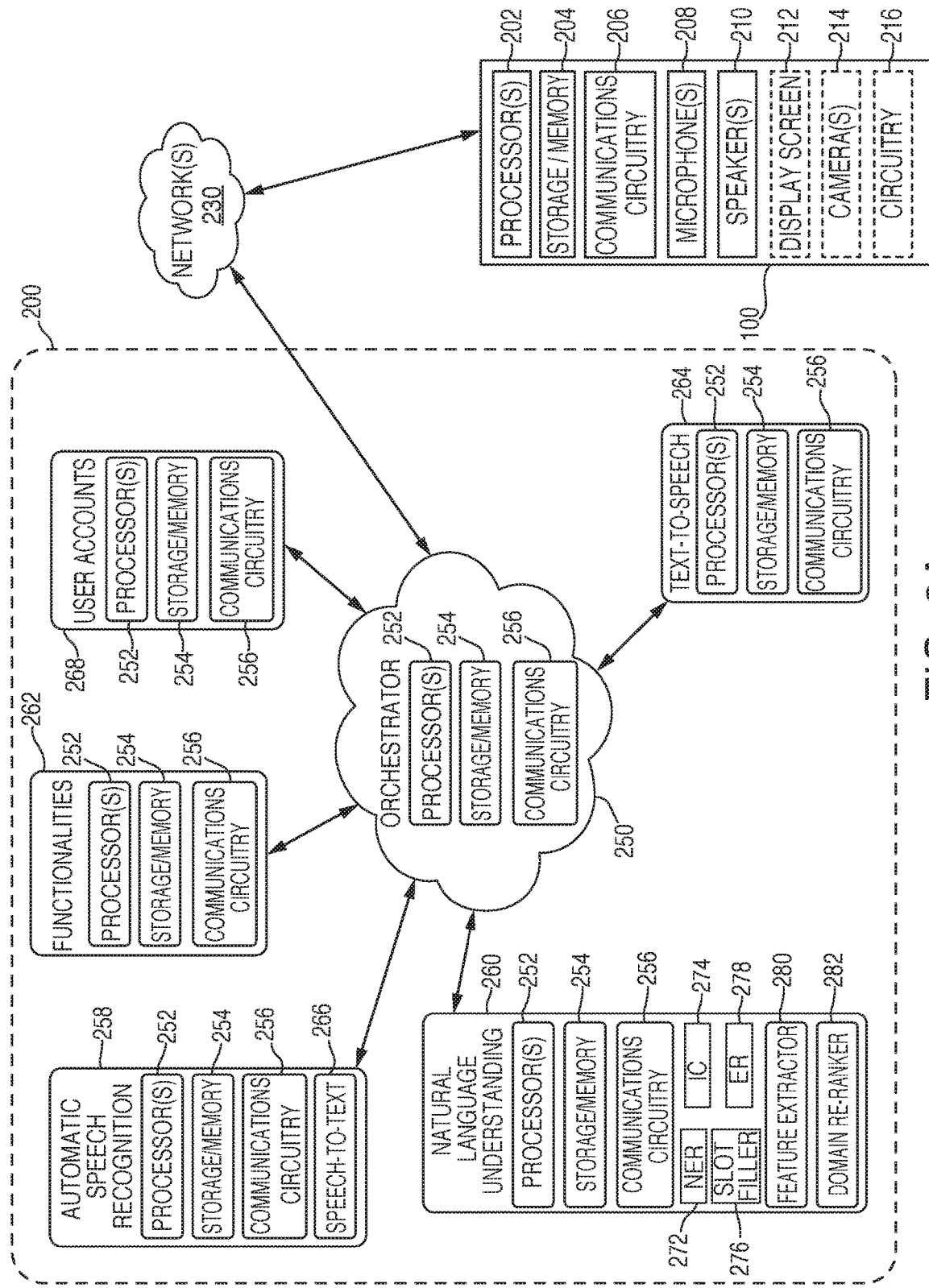
FIG. 2A is an illustrative diagram of a representative system architecture that can interact with the exemplary portable electronic device of FIGS. 1A and 1B, in accordance with various embodiments.

FIG. 2A is an illustrative diagram of a representative system architecture that can interact with the exemplary portable electronic device of FIGS. 1A and 1B, in accordance with various embodiments. Portable electronic device 100, which generally represents portable electronic devices 100A and 100B, as well as other embodiments, may include sound controlled functionality, such as one or more voice and/or sound activated components. In some embodiments, portable electronic device 100 may be configured to communicate with speech-processing system 200 in response to detecting an utterance that includes a wakeword, which may subsequently be followed by a request/question/statement. Similarly, portable electronic device 100 may alternatively or additionally include one or more manually activated components for manually activating electronic device 100. In this particular scenario, portable electronic device 100 may also be configured, in one embodiment, to communicate with speech-processing system 200 in response to a manual input being detected by one or more input mechanisms, such as a touch screen, a button, and/or a switch, for example.

In a non-limiting embodiment, portable electronic device 100 may be capable of being activated in response to detecting a specific sound, such as a wakeword, as well as, or alternatively, via one or more inputs. After detecting a specific sound (e.g., a wakeword or trigger expression), portable electronic device 100 may recognize commands (e.g., audible commands, inputs) within captured audio, and may perform one or more actions in response to the received commands. Furthermore, portable electronic device 100 may also be configured to perform one or more actions in response to detecting a particular touch, or mechanical, input(s) via electronic device 100. Portable electronic device 100 may be similar to portable electronic device 100A described in connection with FIG. 1A and the same description applies herein.

Portable electronic device 100, in one embodiment, may include a minimal number of input mechanisms (e.g., a power on/off switch) such that functionality of portable electronic device 100 may solely or primarily be through audio input and audio output. For example, portable electronic device 100 may include, or be in communication with, one or more microphones that listen for a wakeword by continually monitoring local audio. In response to the wakeword being detected, portable electronic device 100 may establish a connection with speech-processing system 200, send audio data to speech-processing system 200, and await/receive a response from speech-processing system 200. In some embodiments, however, non-voice/sound activated devices may also communicate with speech-processing system 200. For example, in response to a button or touch screen being pressed, or a button or touch screen being pressed and held, a microphone associated with portable electronic device 100 may begin recording local audio, establish a connection with speech-processing system 200, send audio data representing the captured audio to speech-processing system 200, and await/receive a response, and/or action to be occur, from speech-processing system 200.

Speech-processing system 200 may be located within a dedicated computing device or computing system, which may or may not be in communication with one or more additional devices. For instance, speech-processing system 200 may be located on a remote computing system with which an individual subscribes to a service on. However, speech-processing system 200 may also be included within a computing system locally stored or owned by an individual. Speech-processing system 200 may also be implemented through a series of one or more servers that can communicate with large numbers of portable electronic devices 100 simultaneously via network communications, such as the internet.

Portable electronic device 100 may include one or more processors 202, storage/memory 204, communications circuitry 206, one or more microphones 208 or other audio input devices (e.g., transducers), one or more speakers 210 or other audio output devices, a display screen 212, one or more cameras 214 or other image capturing components, and circuitry 216. Circuitry 216 may be similar to the circuitry described above in connection with FIGS. 1A and 1B, including first circuit 130A and second circuit 150A described in connection with FIG. 1A and first circuit 105B and second circuit 150B described in connection with FIG. 1B, the same descriptions applying herein. One or more additional components may be included within portable electronic device 100, and/or one or more components may be omitted. For example, portable electronic device 100 may also include a power supply or a bus connector. As still yet another example, portable electronic device 100 may include one or more additional input and/or output mechanisms, such as one or more buttons, or one or more switches or knobs. Furthermore, while portable electronic device 100A may include multiple instances of one or more components, for simplicity only one of each component has been shown.

In some embodiments, portable electronic device 100A may correspond to a manually activated device, or may include the functionality of a manually activated device. A manually activated device, as described herein, may correspond to a device that is capable of being activated in response to a manual input (e.g., pressing a button, touching a portion of a touch screen, performing an action on a device). For example, a tap-to-talk device is one type of manually activated device. Such tap-to-talk devices, for instance, are capable of obtaining and outputting audio data in response to a button being pressed.

In one embodiment, portable electronic device 100 may be in communication with an additional processing device including one or more of: processor(s) 202, storage/memory 204, communications circuitry 206, microphone(s) 208, speaker(s) 210, display screen 212, and/or camera(s) 214. For example, a centralized control device of portable electronic device 100 may include one or more microphone(s) 208. These microphone(s) 208 may receive audio input signals, and electronic device may determine whether or not the audio input signals indicate that a wakeword was uttered. If so, then electronic device may cause audio data representing an utterance including the wakeword, or spoken after the wakeword. To be sent to speech-processing system 200.

Processor(s) 202 may include any suitable processing circuitry capable of controlling operations and functionality of portable electronic device 100, as well as facilitating communications between various components within portable electronic device 100. In some embodiments, processor(s) 202 may include a central processing unit ("CPU"), a graphic processing unit ("GPU"), one or more microprocessors, a digital signal processor, or any other type of processor, or any combination thereof. In some embodiments, the functionality of processor(s) 202 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 202 may include its own local memory, which may store program systems, program data, and/or one or more operating systems. However, processor(s) 202 may run an operating system ("OS") for electronic device 100, and/or one or more firmware applications, media applications, and/or applications resident thereon. In some embodiments, processor(s) 202 may run a local client script for reading and rendering content received from one or more websites. For example, processor(s) 202 may run a local JavaScript client for rendering HTML or XHTML content received from a particular URL accessed by electronic device 100.

Storage/memory 204 may include one or more types of storage mediums such as any volatile or non-volatile memory, or any removable or non-removable memory implemented in any suitable manner to store data for electronic device 100. For example, information may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 204 may be implemented as computer-readable storage media ("CRSM"), which may be any available physical media accessible by processor(s) 202 to execute one or more instructions stored within storage/memory 204. In some embodiments, one or more applications (e.g., gaming, music, video, calendars, lists, etc.) may be run by processor(s) 202, and may be stored in memory 204.

In some embodiments, storage/memory 204 may include a media system, which may be configured to facilitate communications between electronic devices 100 and speech-processing system 200. For example, the media system may store one or more communications protocols that may be executed by processor(s) 202 for facilitating communications for electronic device 100. In some embodiments, a sessions initiation protocol ("SIP") may be used to facilitate media transfer between portable electronic device 100 and one or more of speech-processing system 200 and another electronic device 100. SIP, for example, is an application layer protocol that is text based, and may employ Real-time Transport Protocol ("RTP") or Secure Real-time Transport Protocol ("SRTP") functions. In particular, SIP communications functionality may be employed to support audio, video, presence, and messaging communications for electronic device 100. In some embodiments, a Web Real-Time Communications ("WebRTC") protocols may be employed by electronic device 100. In a non-limiting embodiment, the media system may include instructions that indicate which communications protocols to employ for facilitating media transfer between devices based on a device type of electronic device 100. For example, if portable electronic device 100A does not include display 212 and/or camera 214, then the media system may indicate that PJSIP should be used, whereas if portable electronic device 100A includes display 212 and/or camera 214 then the media system may indicate that WebRTC protocols should be used.

In some embodiments, storage/memory 204 may include one or more systems and/or databases, such as a speech recognition system, a wakeword database, a sound profile database, and a wakeword detection system. The speech recognition system may, for example, include an automatic speech recognition ("ASR") component that recognizes human speech in detected audio. The speech recognition system may also include a natural language understanding ("NLU") component that determines user intent based on the detected audio. Also included within the speech recognition system may be a text-to-speech ("TTS") component capable of converting text to speech to be outputted by speaker(s) 210, and/or a speech-to-text ("STT") component capable of converting received audio signals into text to be sent to speech-processing system for processing.

The wakeword database may be a database stored locally by storage/memory 204 of portable electronic device 100, and may include a list of a current wakeword for electronic device 100, as well as one or more previously used, or alternative, wakewords for voice activated electronic device. In some embodiments, an individual may set or program a wakeword for their portable electronic device 100. The wakeword may be programmed directly on portable electronic device 100, or a wakeword or wakewords may be set by the individual via a local client application that is in communication with speech-processing system 200. For example, an individual may use their mobile device having the speech-processing system application running thereon to set the wakeword. The specific wakeword may then be communicated from the mobile device to speech-processing system 200, which in turn may send/notify portable electronic device 100 of the individual's selection for the wakeword. The selected activation may then be stored in the wakeword database of storage/memory 204. In some embodiments, additional trigger expressions or permutations of the wakeword may also be stored within storage/memory 204. For example, specific trigger expressions or words that indicate the presence of the wakeword may also be stored within storage/memory 204. In some embodiments, audio watermarks, indicating a specific action or message, may also be stored within storage/memory 204.

In some embodiments, sound profiles for different words, phrases, commands, or audio compositions are also capable of being stored within storage/memory 204, such as within a sound profile database. For example, a sound profile of audio may be stored within the sound profile database of storage/memory 204 on electronic device 100. In this way, if a particular sound (e.g., a wakeword or phrase) is detected, a corresponding command or request may be ignored, for example. A sound profile, for example, may correspond to a frequency and temporal decomposition of a particular audio file or audio portion of any media file, such as an audio fingerprint or spectral representation.

The wakeword detection system may be similar to wakeword detection circuit 154A described above in connection with FIG. 1A and the same description applies herein.

Communications circuitry 206 may include any circuitry allowing or enabling one or more components of portable electronic device 100A to communicate with one another, and/or with one or more additional devices, servers, and/or systems. For example, communications circuitry 206 may facilitate communications between portable electronic device 100A and speech-processing system 200. As an illustrative example, audio data representing an utterance (e.g., utterance 4 of FIG. 1) may be transmitted over a network 230, such as the Internet, to speech-processing system 200 using any number of communications protocols. For example, network(s) 230 may be accessed using Transfer Control Protocol and Internet Protocol ("TCP/IP") (e.g., any of the protocols used in each of the TCP/IP layers), Hypertext Transfer Protocol ("HTTP"), WebRTC, SIP, and wireless application protocol ("WAP"), are some of the various types of protocols that may be used to facilitate communications between portable electronic device 100A and speech-processing system 200. In some embodiments, portable electronic device 100A and speech-processing system 200 may communicate with one another via a web browser using HTTP. Various additional communication protocols may be used to facilitate communications between portable electronic device 100A and speech-processing system 200, including, but not limited to, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network protocol), infrared, BitTorrent, FTP, RTP, RTSP, SSH, and/or VOIP.

Communications circuitry 206 may use any communications protocol, such as any of the previously mentioned exemplary communications protocols. In some embodiments, portable electronic device 100A may include one or more antennas to facilitate wireless communications with a network using various wireless technologies (e.g., Wi-Fi, Bluetooth, radiofrequency, etc.). In yet another embodiment, portable electronic device 100A may include one or more universal serial bus ("USB") ports, one or more Ethernet or broadband ports, and/or any other type of hardwire access port so that communications circuitry 206 allows portable electronic device 100A to communicate with one or more communications networks.

Speech-processing system 200 may include various components and modules including, but not limited to, automatic speech recognition ("ASR") system 258, natural language understanding ("NLU") system 260, functionalities system 262, text-to-speech ("TTS") module 264, and user accounts system 268. In some embodiments, speech-processing system 200 may also include an orchestrator system 250 capable of orchestrating one or more processes to be performed by one or more of ASR system 258, NLU system 260, functionalities system 262, TTS system 264, and/or user accounts system 268, as well as one or more additional components, devices, and/or systems associated therewith. Speech-processing system 200 may also include computer readable media, including, but not limited to, flash memory, random access memory ("RAM"), and/or read-only memory ("ROM"). Speech-processing system 200 may also include various modules that store software, hardware, logic, instructions, and/or commands for speech-processing system 200, such as a speaker identification ("ID") module, or any other module, or any combination thereof.

ASR system 258 may be configured to recognize human speech in detected audio, such as audio captured by electronic device 100, which may then be transmitted to speech-processing system 200. ASR system 258 may include, in one embodiment, one or more processor(s) 252, storage/memory 254, and communications circuitry 256. Processor(s) 252, storage/memory 254, and communications circuitry 256 may, in some embodiments, be substantially similar to processor(s) 202, storage/memory 204, and communications circuitry 206, which are described in greater detail above, and the aforementioned descriptions may apply. Furthermore, in some embodiments, ASR system 258 may include speech-to-text ("STT") system 266. STT system 266 may employ various speech-to-text techniques. However, any suitable computer implemented speech to text technique may be used to convert the received audio signal(s) into text, such as SOFTSOUND speech processing technologies available from the Autonomy Corporation, which is headquartered in Cambridge, England, United Kingdom.

ASR system 258 may include an expression detector that analyzes audio signals received by speech-processing system 200, such as the expression detector mentioned above with regards to electronic device 100. Such an expression detector may be implemented using keyword spotting technology, as an example. A keyword spotter is a functional component or algorithm that evaluates an audio signal to detect the presence of a predefined word or expression, such as a passphrase or other sound data, within the audio signals. Rather than producing a transcription of words of the speech, a keyword spotter generates a true/false output (e.g., a logical I/O) to indicate whether or not the predefined word or expression was represented in the audio signal. In some embodiments, an expression detector may be configured to analyze the audio signal to produce a score indicating a likelihood that a particular word or phrase (e.g., a wakeword), is represented within the audio signal. The expression detector may then compare that score to a threshold value to determine whether that word or phrase will be declared as having been spoken.

For instance, ASR system 258 may transcribe received audio data into text data representing the words of the speech contained in the audio data using STT system 266. The text data may then be used by other components for various purposes, such as executing system commands, inputting data, etc. ASR system 258 may then interpret an utterance based on the similarity between the utterance and pre-established language models stored in an ASR model knowledge base of storage/memory 254. For example, the input audio data may be compared with models for sounds (e.g., sub-word units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing a likelihood that a particular set of words matches those spoken in the utterance. The confidence score may be based on a number of factors including, for example, the similarity of the sound in the utterance to models for language sounds (e.g., an acoustic model), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, ASR system 258 may output the most likely text recognized in the audio data. ASR system 258 may also output multiple hypotheses in the form of a lattice or an N-best list with each hypothesis corresponding to a confidence score or other score (such as probability scores, etc.).

ASR system 258 may further attempt to match received feature vectors to language phonemes and words as known in acoustic models and language models stored within storage/memory 254 of ASR system 258. Recognition scores may be determined for the feature vectors based on acoustic information and language information. The acoustic information may be used to calculate an acoustic score representing a likelihood that the intended sound represented by a group of feature vectors matches a language phoneme. The language information may be used to adjust the acoustic score by considering what sounds and/or words are used in context with each other, thereby improving the likelihood that the speech recognition process will output speech results that make sense grammatically. The specific models used may be general models or may be models corresponding to a particular domain, such as music, application enablement/disablement, shopping, etc.

ASR system 258 may generate results in the form of a single textual representation of the speech, an N-best list including multiple hypotheses and respective scores, and/or lattice, for example, which may be sent to NLU system 260 for processing, such as conversion of the text into commands for execution, either by electronic device 100, speech-processing system 200, or by another device, such as a separate device or server capable of performing one or more additional functionalities thereon (e.g., a television capable of outputting video content).

NLU system 260 may be configured such that it determines an intent of an utterance based on the received audio data. NLU system 260 may determine one or more domains, which may also be referred to as categories that may be capable of handling the intent of the utterance. For example, utterance 4, "Play this," may be identified by a Music domain, an E-Book domain, and a Video domain as possibly being able to handle the corresponding request. For instance, NLU system 260 may identify that the word "Play" may be a recognized intent of each of the aforementioned domains (as well, possibly, other domains). In some embodiments, to determining an utterance's intent, NLU system 260 may communicate with functionalities system 262 to cause one or more specific functionalities to be accessible, perform one or more tasks, and/or retrieve an appropriate response or response information. NLU system 260 may include processor(s) 252, storage/memory 254, and communications circuitry 256 which, in one embodiment, may be substantially similar to processor(s) 202, storage/memory 204, and communications circuitry 206 of electronic device 200, and the previous description may apply.

NLU system 260 may include a named entity recognition ("NER") system 272, which may be used to identify portions of text that correspond to a named entity recognizable by NLU system 260. A downstream process called named entity resolution may be configured to link a portion of text to an actual specific known entity. To perform named entity resolution, the system may utilize gazetteer information stored in an entity library storage. The gazetteer information may be used for entity resolution, for example matching ASR results with different entities (such as song titles, contact names, etc.). Gazetteers may be linked to a user account or profile of users accounts module 268, certain domains (e.g., music or shopping), or may be organized in a variety of other ways.

Generally, NLU system 260 takes textual input and attempts to make a semantic interpretation of the text. That is, NLU system 260 may be configured to determine a meaning of text based on the individual words and then implements that meaning. In some embodiments, NLU system 260 may interpret a text string to derive an intent or a desired action of the utterance (e.g., utterance 304) as well as the pertinent pieces of information in the text that allow an action to be completed. For example, if a spoken utterance is processed by ASR system 258 and outputs the text, "call mom," NLU system 260 may determine that an intent of the utterance is to activate a telephone, or telephone functionality, and to initiate a call with a contact matching the entity "mom". In some embodiments, NLU system 260 may process several textual inputs related to the same utterance. For example, if ASR system 258 outputs N text segments (as part of an N-best list), then NLU system 260 may process all N outputs.

As will be discussed further below, NLU system 260 may be configured to parse and tag annotate text. For example, for the text "call mom," "call" may be tagged as a command (e.g., a command to execute a phone call), and "mom" may be tagged as a specific entity and target of the command (e.g., a telephone number for the entity corresponding to "mom" stored in a contact list). Further, NLU system 260 may be used to provide answer data in response to queries, for example using a knowledge base stored within storage/memory 254 of NLU system 260 and/or storage/memory of speech-processing system 200.

To correctly perform natural language understanding processing of speech input, NLU system 260 may be configured to determine a domain of an utterance. By determining the domain, NLU system 260 may narrow down which services and functionalities offered by an endpoint device (e.g., electronic device 100, speech-processing system 200, or any other electronic device or system) may be relevant. For example, an endpoint device may offer services relating to interactions with a telephone service, a contact list service, a calendar/scheduling service, a music player service, etc. As another example, an endpoint device may enable certain services or functionalities for an individual having a user account of speech-processing system 200. Words in a single text query may implicate more than one service, and some services may be functionally linked (e.g., both a telephone service and a calendar service may utilize data from the contact list).

NER system 272 may be configured to receive a query in the form of one or more results from ASR system 258. NER system 272, which is described in greater detail within FIG. 2B, may then attempt to identify relevant grammars and lexical information that may be used to construe meaning of the one or more results. To do so, NER system 272 may begin by identifying potential domains that may relate to the received query. NLU system 260, may include a databases of devices within storage/memory 254 of NLU system 260 that may be used to identify domains associated with specific devices. For example, portable electronic device 100A may be associated with domains for music, telephone functionality, calendar information, contact lists, and/or device-specific communications. In addition, NLU system 260 may store an entity library including database entries for specific services available on a specific device or devices, either indexed by that device's identification number, a customer identification number, a household identification number, and/or using any other suitable indicator.

In one non-limiting embodiment, a domain may represent a discrete set of activities, services, and/or functionalities that have a common theme, such as "shopping," "music," or "videos." As such, each domain may be associated with a particular language model and/or grammar database, a particular set of intents/actions, and a particular personalized lexicon. In some embodiments, each user account may have its own language model including words, phrases, sentence structures, response templates, and the like, configured for the user account. Each gazetteer may include domain-indexed lexical information associated with a particular user account of user accounts system 268 and/or electronic device 100. For example, a first gazetteer may include first domain-index lexical information. A user's music-domain lexical information might include album titles, artist names, and song names, for example, whereas a user's contact-list lexical information might include the names of contacts. Since every user's music collection and contact list is presumably different, this personalized information improves entity resolution.

In some embodiments, NLU system 260 may be configured to apply the rules, models, and information applicable to each identified domain. For example, if a query potentially implicates both communications and music, the query may, substantially in parallel, the natural language understanding processing may use the grammar models and lexical information for communications, and may also use the grammar models and lexical information for music. The responses based on the query produced by each set of models is scored, with the overall highest ranked result from all applied domains is ordinarily selected to be the correct result, which is described in greater detail below with reference to FIG. 2B.

An intent classification ("IC") system 274 may parse the query to determine an intent or intents for each identified domain, where the intent corresponds to the action to be performed that is responsive to the query. Each domain is associated with a database of words linked to intents. For example, a music intent database of a music domain may link words and phrases such as "play," to a play music intent, "stop," to a stop playing music intent, and "mute" to a mute volume intent. IC system 274 may be configured to identify potential intents for each domain by comparing words in the query to the words and phrases in that domain's intents database. Traditionally, the determination of an intent by IC system 274 is performed using a set of rules or templates that are processed against the incoming text to identify a matching intent.

In order to generate a particular interpreted response, NER system 272 applies the grammar models and lexical information associated with the respective domain to actually recognize one or more entities in the text of the query. Each grammar model includes the names of entities (i.e., nouns) commonly found in speech about the particular domain (i.e., generic terms), whereas the lexical information from the gazetteer is personalized to the user(s) and/or the device. For instance, a grammar model associated with the shopping domain may include a database of words commonly used when people discuss shopping.

The intents identified by IC system 274 may be linked to domain-specific grammar frameworks having "slots" or "fields" to be filled. Each slot or field may correspond to a portion of the query text that the system believes corresponds to an entity. For example, if "play music" is an identified intent, a grammar framework or frameworks may correspond to sentence structures such as "Play {Artist Name}," "Play {Album Name}," "Play {Song name}," "Play {Song name} by {Artist Name}," etc. However, to make resolution more flexible, these frameworks would ordinarily not be structured as sentences, but rather based on associating slots with grammatical tags. As another example, if "Play 'Song 1'" is an identified intent, a grammar framework may correspond to sentence structures such as "Play {Song 1}."

NER system 272 may parse the query to identify words as subject, object, verb, preposition, etc., based on grammar rules and/or models, prior to resolving named entities. The identified verb may be used by IC module 274 to identify intent, which is then used by NER system 272 to identify frameworks. A framework for an intent of "play" may specify a list of slots/fields/placeholders applicable to place the identified "object" such as, for example, {Artist Name}, {Album Name}, {Song Name}, {Application Name}, {Anaphoric Term}, and any object modifier (e.g., a prepositional phrase). NER system 272 may then search the corresponding fields in the domain-specific and personalized lexicon(s), attempting to match words and phrases in the query, which are tagged as a grammatical object or object modifier, with those identified in the database(s).

This process may include semantic tagging, which is the labeling of a word or a combination of words according to their type/semantic meaning. Parsing may be performed using heuristic grammar rules, or an NER model may be constructed using techniques such as hidden Markov models, maximum entropy models, log linear models, conditional random fields ("CRF"), and the like.

For instance, a query of "Play 'Song 1' by 'Artist 1'" might be parsed and tagged as {Verb}: "Play," {Object}: "Song 1," {Object Preposition}: "by," and {Object Modifier}: "Artist 1." At this point in the process, "Play" may be identified as a verb based on a word database associated with the music domain, which IC module 276 may determine corresponds to the "play music" intent. No determination has been made as to the meaning of "Song 1" and "Artist 1," but based on grammar rules and models, it may be determined that the text of these phrases relate to the grammatical object (i.e., entity) of the query.

The frameworks linked to the intent may then be used to determine what database fields should be searched to determine the meaning of these phrases, such as searching a user's gazette for similarity with the framework slots. So a framework for a "play music" intent might attempt to resolve the identified object for {Artist Name}, {Album Name}, {Song Name}, and {Application Name}, {Anaphoric Term} and another framework for the same intent might attempt to resolve the object modifier based on {Artist Name}, and resolve the object based on {Album Name} and {Song Name} linked to the identified {Artist Name}. If the search of the gazetteer does not resolve a slot/field using gazetteer information, NER system 272 may search the database of generic words associated with the particular domain. So for instance, if the query was "play songs by 'Artist 1,'" after failing to determine an album name or song name called "songs" by "Artist 1," NER system 272 may search the domain vocabulary for the word "songs." For example, use of the object "songs" may correspond to some or all of the songs associated with a particular artist (e.g., "Artist 1"). In the alternative, generic words may be checked before the gazetteer information, or both may be tried, potentially producing two different results.

The results of the natural language understanding processing may be tagged to attribute meaning to the query. So, for instance, "Play 'Song 1' by 'Artist 1'" might produce a result of: {Domain}: "Music," {Intent}: "Play Music," {Artist Name}: "Artist 1," {Media Type}: "Song," and {Song Name}: "Song 1." As another example, "Play songs by 'Artist 1'" might produce: {Domain}: "Music," {Intent}: "Play Music," {Artist Name}: "Artist 1," and {Media Type}: Song. Still further, "Add this to my cart" might produce a result of: {Domain} Shopping, {Intent} "Add item to," {Anaphoric Term}: "this," and {List Type} "cart."

The output from NLU system 260 (which may include tagged text, commands, etc.) may then be sent to orchestrator 250 and/or a command processor, which may be located on, or may be in communication with, speech-processing system 200. The destination command processor may be determined based on the output of NLU system 260. For example, if NLU system 260 outputs include a command to play music, the destination command processor may be a music playing application, such as one located on portable electronic device 100A or in a music playing application, configured to execute a music playing command to cause a particular audio file to output. If the output of NLU system 260, however, includes a search request, the destination command processor may include a search engine processor, such as one located on a search server, configured to execute a search command. If the output of NLU system 260 includes a request for enablement of an application's functionalities for a particular user account, then the language model for the user account may be updated to include one or more invocations, utterance frameworks, response frameworks, and values for the frameworks, for a particular application.

In some embodiments, NLU system 260 may also include an entity resolution module 278, which allows NLU system 260 to query each domain of NLU system 260 to determine which domain or domains believe that they can handle a given request. Upon performing the query, each domain of domain system 272 may return a "score" indicating a likelihood that they can handle the application in question. For instance, various domains may return scores of LOW, MEDIUM, or HIGH, indicating the likelihood that they can handle the particular application. Entity recognition module 278 may return application names or titles for the request, which may be based on relevance scores that estimate a confidence that a particular application may be best used for the request. As an illustrative example, if the utterance is, "Play my music," NLU system 260 may determine, using entity resolution module 278, which domains, and thus applications, can likely handle this request, and may select the domain and/or application having the highest confidence score as being the domain and/or application able to handle the request. Furthermore, as described in greater detail below with reference to FIG. 2B, NLU system 260 may further include a slot filler module 276.

In some embodiments, NLU system 260 may include a contextual resolution system 270, which may be a system configured to identify entities for assisting natural language understanding processing using contextual metadata corresponding to content being displayed by display screen 120A. Contextual resolution system 270 may receive contextual metadata from orchestrator 250 (e.g., that may be generated and sent from a particular domain of functionalities 262) and/or from electronic device 100. The contextual metadata my include information associated with the particular content currently being rendered by a requesting device. In some embodiments, the contextual metadata may be obtained in response to receiving audio data. For example, in response to receiving audio data representing utterance 4, voice activated portable electronic device 100A may send a notification to speech-processing system 200 that indicates that content is currently being rendered by display screen 120A.

In one embodiment, orchestrator 250 may be configured to receive the audio data, and may determine that the notification has also been received. Orchestrator 250 may determine whether or not the notification indicates that there is (or was) content displayed by display screen 120A at the time that the utterance was spoken (e.g., when the wakeword was uttered). However, the determination of whether content is being displayed by display screen 120A may correspond to a time just prior to the wakeword being uttered, when the wakeword was uttered, after the wakeword was uttered, during the utterance being spoken, after the utterance was spoken, and/or after the audio data is sent to speech-processing system 200, and the aforementioned is merely exemplary. The notification may correspond to a flag, such as a logical I/O, where if the flag has a value of 1, then this may indicate that content is being rendered by electronic device 100, whereas if the flag has a value of 0, then this may indicate that not content is being rendered by electronic device 100.

Upon determining that portable electronic device 100 is rendering content (e.g., receiving a notification indicating that content is being displayed by display screen 120A), orchestrator 250 may generate and send a request to the various domains associated with functionalities system 262 and NLU system 260. The request may inquire as to which domain, or domains, are currently providing portable electronic device 100 with content, such as the content being rendered. Upon determining that domain, or domains, that are providing content, orchestrator 250 may request that the identified domain(s) generate and send contextual metadata representing text corresponding to the displayed content. After receiving the contextual metadata from the corresponding domain(s), orchestrator 250 may provide the contextual metadata to contextual resolution system 270, or otherwise cause the contextual metadata to be sent to NLU system 260.

In some embodiments, the various domains may include formatting logic (e.g., speechlets) that may format the contextual metadata. The contextual metadata may be structured, in response to the formatting logic applying its formatting rules, such that attributes of the content are arranged in contextual slots including values associated with those slots. For instance, the contextual metadata may also be referred to, or may generally correspond to, entity data representing content being displayed by display screen 120A during a time when an utterance is spoken. For example, single item or detail web page of an item, such as a coffee maker, may include entity data organized into contextual slots such as {Item Name}, {List Position}, and {Item Identifier}. Values from the particular web page being displayed currently by display screen 120A may include: {Item Name}: "Coffee Maker," {List Position}: "1," and {Item Identifier}: "abcd1234." Different types of content may include different contextual slots. For example, lists may include {List Types}, {List Position}, {List Name}, etc.

In some embodiments, contextual resolution system 270 may determine whether any slots/fields from intent resolution processing by NLU system 260 substantially match any slots/fields from the contextual metadata received. For instance, the entity data that is received from the domain may include similar entities (e.g. slots) as the entities associated with the intent identified by NLU system 260. This may include having contextual slots from the contextual metadata being associated with similar attributes as those of slots from intent resolution by NLU system 260. As an example, the "Play Music" intent may include slots for application data—{Application Data Slot}, song name—{Song Name}, album name—{Album Name}, artist name—{Artist Name}, genre name—{Genre Name}, playlist name {Playlist Name}, media type—{Media Type}, sort type—{Sort Type}, play mode—{Play Mode}, service name—{Service Name}, anaphor—{Anaphor}, list position—{List Position}, recommend trigger—{Recommended Trigger}, and similar trigger—{Similar Trigger}.

From NLU system 260, the text data may be used to identify some or all of the values for these slots. For example, if the utterance is, "Play 'Song 1'," then {Song Name} may have a value "Song 1." However, the remaining slots may remain unfilled. The contextual metadata may indicate information regarding a GUI displayed by display screen 120A, where the GUI includes a detailed page associated with a song (e.g., "Song 1") or be a list including one item, the song. For example, the contextual metadata may include a song name contextual slot, {Song Name}, with a filled value being "Song 1," as well as an album name contextual slot, {Album Name}, having a filled value "Album 1." In this particular scenario, the album name contextual slot {Album Name} may be provided to NLU system 260.

Contextual resolution system 270 may, in some embodiments, be configured to determine that one or more of the declared slots from the intent matches one or more contextual entity slots from the contextual metadata. This may allow for resolution of the entity based on the contextual metadata. For example, if an individual says, "Play 'Song 1'," and the contextual metadata indicates that there is a contextual entity slot {Song Name} having a value "Song 1," then the specific song to be played may be determined to be the audio filed associated with "Song 1."

Contextual resolution system 270, in one embodiment, may be configured to determine a heuristics score that indicates a number of matching entities (e.g., matching slots) between the entity data/contextual metadata and the declared slots for the identified intent. For example, using the previous example, the contextual metadata may include such slots as {Song Name}, {Album Name}, and/or {Artist Name}, amongst other slots. Therefore, in this particular scenario, the heuristics score may be three, indicating that there are three slots corresponding to similar entities for both the declared slots from IC component 274 and contextual resolution system 270. If the heuristics score is greater than zero, then NLU system 260 may be configured to generate a selected context file that may be included with the output data from NLU system 260, which orchestrator 250 may provide back to an application, or applications, of functionalities system 262 to perform, or attempt to perform, one or more actions.

Functionalities system 262 may, for example, correspond to various action specific applications, which are capable of processing various task specific actions and/or performing various functionalities. Functionalities system 262 may further correspond to first party applications and/or third party applications capable of performing various tasks or actions, or performing various functionalities. For example, based on the context of the audio received from electronic device 100, speech-processing system 200 may use a certain application to generate a response, or to obtain response information, which in turn may be communicated back to portable electronic device 100A and/or to another electronic device (e.g., a television). Functionalities system 262 may also include processor(s) 252, storage/memory 254, and communications circuitry 256.

In some embodiments, an application of functionalities system 262 may be written in various computer languages, such as JavaScript and Java. Various applications may include an intent schema file and a sample utterances file, such as, for example, IntentSchema.json including the JSON defining the intents of a particular application, and a SampleUtterances.txt including plain text sample utterances for the particular application. Applications may also include application specific code, such as a JavaScript or Java file, common library code, and various other JavaScript or Java modules.

TTS system 264 may employ various text-to-speech techniques. However, any suitable computer implemented speech to text technique may be used to convert the received audio signal(s) into text, such as SOFTSOUND speech processing technologies available from the Autonomy Corporation, which is headquartered in Cambridge, England, United Kingdom. TTS system 264 may also include processor(s) 252, storage/memory 254, and communications circuitry 256.

User accounts system 268 may store one or more user accounts or user profiles, corresponding to users having an account on speech-processing system 200. For example, a parent may have an account registered on speech-processing system 200, and each of the parent's children may have their own user profile registered under the parent's account. Information, settings, and/or preferences, for example, for each user profile may be stored by user accounts system 268. In some embodiments, user accounts system 268 may store a voice signal, such as voice biometric information, for a specific user profile. This may allow speaker identification techniques to be used to match a voice to voice biometric data associated with a specific user profile. In some embodiments, user accounts system 268 may store a telephone number assigned to a particular user profile. In some embodiments, user accounts system 268 may include a list of media items currently stored within an individual's registered account or user profile. For example, a list of music or videos purchased or obtained by an individual may be stored within the individual's user profile on user accounts system 268, which may be accessed by the individual when the individual seeks to hear a particular song or songs, or view a particular video or videos. User accounts system 268 may also include a listing of all applications currently enabled for each user profile. In some embodiments, NLU system 260 may receive indications of which applications are currently enabled for a particular user profile or account, such that NLU system 260 is aware of which rules and capabilities that speech-processing system 200 is able to perform for the particular user profile or account.

Orchestrator 250, in a non-limiting embodiment, may correspond to any suitable device, system, and/or logic capable of performing one or more processes. For example, orchestrator 250 may be configured to request contextual metadata from one or more domains/applications of functionalities system 262 in response to receive a notification from portable electronic device 100A that content is currently being rendered thereby. In response to receiving the contextual metadata, orchestrator 250 may be configured to provide the contextual metadata to NLU system 260. In one embodiment, orchestrator 250 may include processor(s) 252, storage/memory 254, and communications circuitry 256.

Although each of ASR system 258, NLU system 260, functionalities system 262, TTS system 264, user accounts system 268, and orchestrator 250 may each include instances of processor(s) 252, storage/memory 254, and communications circuitry 256, and those instances of processor(s) 252, storage/memory 254, and communications circuitry 256 within each of ASR system 258, NLU system 260, functionalities system 262, TTS system 264, user accounts system 268, and orchestrator 250 may differ. For example, the structure, functionality, and style of processor(s) 252 within ASR system 258 may be substantially similar to the structure, functionality, and style of processor(s) 252 within NLU system 260, however the actual processor(s) 252 need not be the same entity.

Figure 2B:
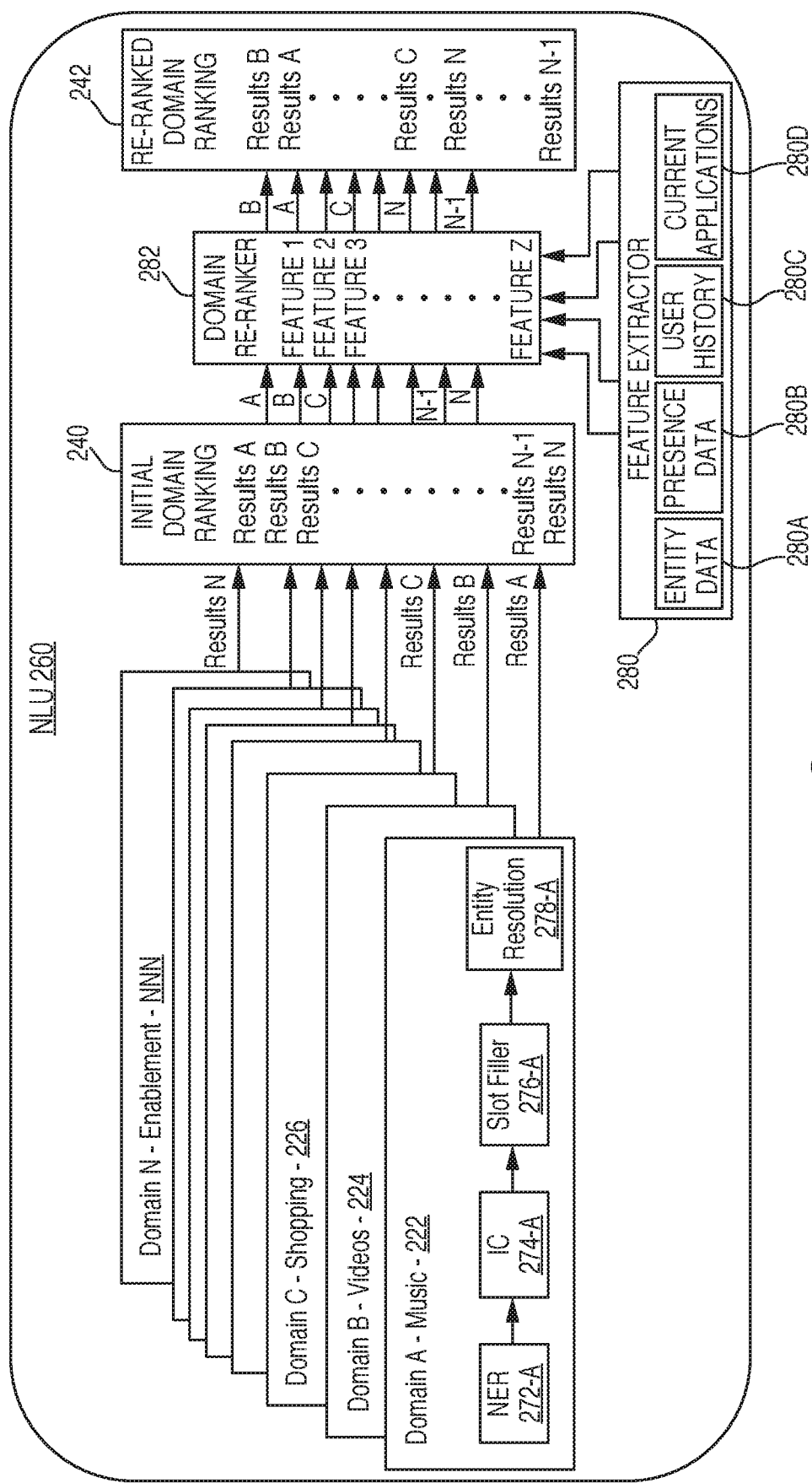
FIG. 2B is an illustrative diagram of a multi-domain architecture that can be utilized with the representative system architecture of FIG. 2A, in accordance with various embodiments.

FIG. 2B is an illustrative diagram of a multi-domain architecture that can be utilized with the representative system architecture of FIG. 2A, in accordance with various embodiments. In the multi-domain architecture of NLU system 260, each domain (which may include a set of intents and entity slots that define a larger concept such as music, books, etc.) may be constructed separately and be made available to NLU system 260 during runtime operations where natural language understanding functionality operations are performed on text (such as text output from ASR system 258). Each domain may have specially configured components to perform various steps of the NLU operations. For instance, each domain may include a component of NER system 272, IC system 274, Slot Filler system 276, and entity resolution system 278, which may be specific to that particular domain. In some embodiments, slot filler system 276 and/or entity resolution system 278 may be configured to perform their corresponding functions without deferring until after domain ranking has occurred, however this is merely exemplary. Furthermore, a language model associated with a particular user account may specify various input and output characteristics of NLU system 260, which may vary from user to user based on that particular user's language model.

In the illustrative embodiment, a shopping domain 222 (Domain A) may have an NER component 272-A that identifies what slots, fields, or placeholders (i.e., portions of input text) may correspond to particular entities relevant to that domain. The NER component 272-A may use a machine learning model, such as a domain specific conditional random field ("CRF") to both identify the portions corresponding to an entity as well as identify what type of entity corresponds to the text portion. For example, for the text "Buy 'Coffee Maker'," an NER component 272-A trained for a shopping domain may recognize the portion of text (e.g., "Coffee Maker") corresponds to an entity and an item name. Shopping domain 222 may also have its own intent classification (IC) component 274-A that determines the intent of the text, assuming that the text is within the proscribed domain. IC components may use a model, such as a domain specific maximum entropy classifier, to identify the intent of the text. Shopping domain 222 may also have its own Slot Filler component 276-A that can apply rules or other instructions to standardize labels or tokens from previous stages into an intent/slot representation. The precise transformation may depend on the domain. For example, a travel domain may include a text mention of "<Location> airport," and may be transform the text mentioned to the standard three-letter code referring to that airport (e.g., ZZZ). Shopping domain 222 may also have its own Entity Resolution component 278-A that can refer to an authority source (such as a domain specific knowledge base) used to specifically identify the precise entity referred to in the entity mention identified in the incoming text. Specific intent/slot combinations may also be tied to a particular source, which may then be used to resolve the text (such as by providing information or a command to be executed in response to a user query). Using the example, "Buy 'Coffee Maker'." the source may be tied to a listing of applications and the application names associated with those applications. The output from Entity Resolution component 278-A may include a command, information, or other NLU result data indicating how the domain specific NLU processing handled the text and how the system should respond to the text, according to that specific domain.

As another example, a music domain 224 (Domain B) may have an NER component 272-B that may identify a portion of the input text that may refer to a particular slot. For example, for the text "play songs by 'Artist 1'," an NER component trained for a music domain may recognize the portion of text (e.g., "Artist 1") corresponds to an entity and an artist name. Music domain 224 may also have its own intent classification (IC) component 274-B that may determine the intent of the text, assuming that the text is within the proscribed domain. Music domain 224 may also have its own Slot Filler component 276-B that can apply rules or other instructions to standardize labels or tokens from previous stages into an intent/slot representation. Music domain 224 may also have its own Entity Resolution component 278-A that can refer to an authority source (such as a domain specific knowledge base) used to specifically identify the precise entity referred to in the entity mention identified in the incoming text. Furthermore, entity resolution component 276-D, as well as, in one embodiment, slot filler 276-C, may determine if an entity corresponds to the slot labeling. Specific intent/slot combinations may also be tied to a particular source, which may then be used to resolve the text (such as by providing information or a command to be executed in response to a user query). Using the example, "play songs by Artist 1," the source may be tied to a personal music catalog or the like. The output from Entity Resolution component may include a command, information, or other NLU result data indicating how the domain specific NLU processing handled the text and how the system should respond to the text, according to that specific domain.

In some embodiments, the multiple domains of NLU system 260 of FIG. 2B may operate substantially in parallel, with different domain specific components. That is, shopping domain 222, may have its own NER component 272-A, IC module 274-A, Slot Filler component 276-A, and Entity Resolution component 278-A. Music domain 224 may also have similar components, and so on for the different domains available to the system. The same text that is input into the NLU pipeline for Shopping Domain 222 may also be input into the NLU pipeline for Music Domain 224, where the components for Music Domain 224 may operate on the text as if the text related to Music Domain 224, and so on for the different NLU pipelines for the different domains. Each domain specific NLU pipeline will create its own domain specific NLU results, for example Results A for Shopping Domain 222, Results B for Music Domain 224, Results C for Video Domain 226, and so on. The different results may then be input into a domain ranking component 240, which may rank the different results for the different domains, and selects what the system believes to be the most applicable results given the input text and other factors. Those highest ranking results may then be used to execute a command, perform one or more actions, or obtain information responsive to a user query, or otherwise respond to the input text. In some embodiments, a list of hypotheses after all domains have completed named entity recognition and intent classification may be truncated, and the slot filling and entity resolution may occur on the un-truncated hypotheses. Reordering of the results may further be performed after the slot filling and entity resolution occurs. NLU system 260 may include any number of domains related to any particular subject, and the three domains included in FIG. 2B (e.g., Shopping Domain 222, Music Domain 224, and Video Domain 226) are merely exemplary.

Such a multi-domain architecture results in narrowly defined intents and slots that are particular for each specific domain. This is due, in part, to the different models and components (such as the domain specific NER component, IC module, etc. and related models) being trained to operate only for the designated domain. Further, the separation of domains results in similar actions being represented separately across the domains even if there is overlap in the action. For example, "next song," "next book," and "next" may all be indicators of the same action, but will be defined differently in different domains due to domain specific processing restrictions. Further, domain agnostic queries that cross domains may be difficult to holistically respond to given the divisions between domains. For example, the query "get Title" may refer to a request to purchase a book, play a movie, or play a soundtrack, but the multi-domain architecture and approach of NLU system 260 of FIG. 2B may result in only one such action being performed with any acknowledgement of ambiguity as the "Title" can refer to a book, movie, or soundtrack (or possibly all three).

In one embodiment, text data representing a response may be generated by speech-processing system 200. For instance, NLU system 260 and/or functionalities system 262 may be employed to determine contextual features of a response to be generated, and may generate the corresponding text data representing that response. The text data may then be provided to TTS system 264, which may generate audio data representing the text data, which may then be sent to the requesting device.

In some embodiments, NLU system 260 may include contextual resolution system 270, which may be employed to assist in resolving certain entities based on contextual metadata associated with displayed content. For example, portable electronic device 100A may display a detail web page of an item available for purchase by an individual. The detail web page may include contextual metadata indicating various entities associated with the item such as, but not limited to, an item name—{Item Name}, an item identifier—{Item Identifier}, and the like. In some embodiments, the contextual metadata may also include an anaphoric term, {Anaphoric Term}. If the text of an utterance is, for example, "Buy this," then NLU system 260 may identify that the intent as being a purchasing intent having an entity resolution "Buy," and may also include an anaphoric term "this." Based on this information available from the text data, the purchasing domain may not be able to determine the specific action to perform because the entity "this" may not be able to be associated with a particular item. In this illustrative example, the contextual metadata may assist an application for resolving missing entities. Contextual resolution system 270 may determine which, if any, entities match between the contextual metadata and the declared slots for a particular domain. For example, the purchasing intent may include a slot for an item name, and the contextual metadata may also include a slot for item name having a particular value associated with it. After shopping domain 222 outputs data including any resolved entities, contextual resolution system 270 may append the contextual metadata including the slot and the particular value associated with that slot to the output data. The output data may then be passed to the corresponding application identified by NLU system 260, and the application may use the output data including the selected context file to process the request. In one example, if a coffee maker having an item name "Coffee Maker" is displayed on display screen 120A, then the contextual metadata may include a contextual slot for the entity {Item Name} having a value being "Coffee Maker." Furthermore, a unique identifier associated with the coffee maker having the item name "Coffee Maker" may be included for processing by shopping domain 222. Therefore, when shopping domain 222 outputs data to a shopping application, that output data may include contextual metadata indicating the unique identifier associated with the item.

Figure 3A:
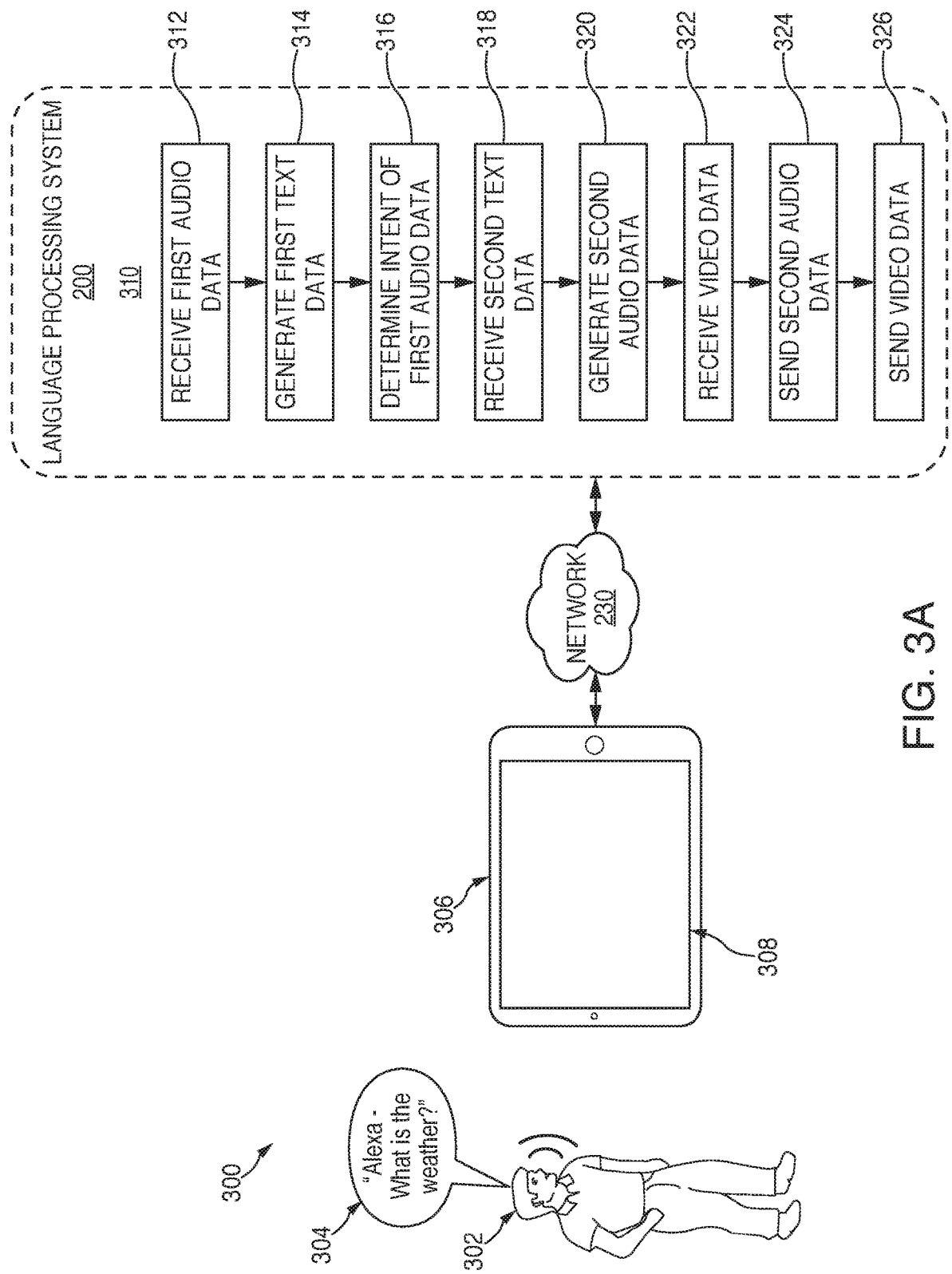
FIG. 3A is an illustrative diagram of an example of the exemplary portable electronic device of FIGS. 1A and 1B, having a two-phase wakeword solution, interacting with the representative system architecture of FIGS. 2A and 2B, in accordance with various embodiments.

FIG. 3A is an illustrative diagram of an example of the exemplary portable electronic device of FIGS. 1A and 1B, having a two-phase wakeword solution, interacting with the representative system architecture of FIGS. 2A and 2B, in accordance with various embodiments. For instance, individual 302 may say, "Alexa—What is the weather." In the non-limiting embodiment, portable electronic device 306 is in standby mode. In standby mode, display screen 308 is off. Portable electronic device 306 may be similar to portable electronic device 100A, portable electronic device 100B, and portable electronic device 100, all described above in connection with FIGS. 1A, 1B and 2A respectively, the descriptions applying herein. Display screen 308 may be similar to display screen 120A described above in connection with FIG. 1A and the same description applies herein.

Portable electronic device 306 may include a first circuit, second circuit, one or more microphones, one or more batteries, one or more processors, storage/memory, one or more cameras, communications circuitry, and one or more speakers. One or more additional components may be included within portable electronic device 306, and/or one or more components may be omitted. For example, portable electronic device 306 may also include one or more processors. The first circuit may be similar to first circuit 130A described above in connection with FIG. 1A and first circuit 105B described above in connection with FIG. 1B, both descriptions applying herein. The second circuit may be similar to second circuit 150A described above in connection with FIG. 1A and second circuit 130B described above in connection with FIG. 1B, both descriptions applying herein. The one or more microphones may be similar to microphone(s) 132A described above in connection with FIG. 1A, microphone(s) 132B described above in connection with FIG. 1B, and microphone(s) 208 described above in connection with FIG. 2A, all three descriptions applying herein. The one or more cameras may be similar to camera(s) 214 described above in connection with FIG. 2A and the same description applies herein. The communications circuitry may be similar to communications circuitry 206 described above in connection with FIG. 2A and the same description applies herein. The one or more speakers may be similar to speaker(s) 210 described above in connection with FIG. 2A and the same description applies herein.

Once portable electronic device 306 receives the audio, in some embodiments, the first circuit may convert the received utterance 304 from an analog signal to a digital signal representing utterance 304. In some embodiments, first circuit may be a low power circuit that may include an analog to digital converter, a first memory buffer circuit, and a voice detection circuit (or voice activity detector). The analog to digital converter may be similar to ADC 134A described above in connection with FIG. 1A and the description applies herein. The first memory buffer circuit may be similar to first memory buffer circuit 136A described above in connection with FIG. 1A and the description applies herein. The voice detection circuit may be similar to voice detection circuit 138A described above in connection with FIG. 1A and the same description applies herein.

After the analog audio input signal is converted into a digital signal, both the memory buffer circuit, and the voice detection circuit may receive the digital signal. In some embodiments, the voice detection circuit may determine that the digital audio representing utterance 304 contains spoken words (i.e. human voice or human speech). If the voice detection circuit determines that a human voice is present, the voice detection circuit may output a switch signal. Moreover, if it is determined that the digital signal representing utterance 304 is a human voice is talking, the memory buffer circuit may output the digital signal. If the voice detection circuit determines that human is not present, portable electronic device 306 remains in standby mode.

In some embodiments, the switch signal output by the voice detection circuit may activate the second circuit. However, in some embodiments, may activate a sub-circuit within the first circuit. In this non-limiting embodiment a sub-circuit is activated by the switch signal output by the voice detection circuit. The sub-circuit may include a pre-wakeword memory buffer circuit and a pre-wakeword detection circuit. The sub-circuit may be similar to second sub-circuit 170B described above in connection with FIG. 1B and the same description applies herein. The second memory buffer circuit may be similar to first memory buffer circuit 136A described above in connection with FIG. 1A and pre-wakeword memory buffer circuit 172B described above in connection with FIG. 1B, the descriptions applying herein.

Once activated, the pre-wakeword memory buffer circuit and the pre-wakeword detection circuit may receive the digital signal from the first memory buffer circuit. The pre-wakeword detection circuit, in some embodiments, may then analyze the digital signal representing utterance 304 to determine the likelihood that a wakeword is present in the digital signal. If the likelihood that a wakeword is present in the digital signal is beyond a predetermined threshold, the pre-wakeword detection circuit may output a second switch signal to activate the second circuit. For example the pre wakeword detection circuit may determine the digital signal representing utterance 306 ("Alexa—What is the weather?") has a high likelihood of containing a wakeword. This high likelihood, in some embodiments, will exceed the predetermined threshold. This determination, in some embodiments, would cause the pre wakeword detection circuit to send a second switch signal to activate the second circuit. This switch signal may be an IRQ. Moreover, if the determined likelihood is above a predetermined threshold, the pre-wakeword memory buffer circuit outputs the digital audio signal. Similar to the embodiment above, if the pre-wakeword detection circuit determines the likelihood a wakeword is present is below a predetermined threshold, portable electronic device 306 remains in standby mode.

The second circuit may be a medium-powered circuit that includes a second memory buffer, a wakeword detection circuit, an activation circuit, and communications circuitry. The second memory buffer circuit may be similar to first memory buffer circuit 136A described above in connection with FIG. 1A and second memory buffer circuit 152B described above in connection with FIG. 1B, the descriptions applying herein. The wakeword detection circuit may be similar to wakeword detection circuit 154A described above in connection with FIG. 1A and wakeword detection circuit 154B described above in connection with FIG. 1B, both descriptions applying herein. The activation circuit may be similar to activation circuit 136B described above in connection with FIG. 1B and the same description applies herein. The communications circuitry may be similar to communications circuitry 206 described above in connection with FIG. 2A and the same description applies herein.

In some embodiments, the activation circuit activates the second circuit when an interrupt signal is received from the first circuit. Once activated, in some embodiments, the second circuit may receive the digital audio signal representing utterance 304 from the first circuit. In particular, the second memory buffer circuit and the wakeword detection circuit may receive the digital audio signal from the first circuit. Once received, the wakeword detection circuit may analyze the digital signal to determine whether a wakeword is present in the digital signal representing utterance 304. For example the wakeword detection circuit may determine "Alexa—What is the weather?" contains the wakeword "Alexa." if the wakeword detection circuit determines that a wakeword is present in the digital signal, the wakeword detection circuit may provide a third switch signal that may connect the third memory buffer with communications circuitry. The communications circuitry may use one or more communication protocols to output the digital audio signal representing utterance 304 from portable electronic device 306 to language processing system 200.

In some embodiments, if a wakeword is present in the received audio, the wakeword detection circuit may send a signal that alters portable electronic device 306 mode from standby mode to active mode. In some embodiments, this may cause display screen 308 to turn on and/or display content. In some embodiments, this may cause display screen 308 to turn on and/or display content. In some embodiments, display screen 308 may turn on and/or display content in response to receiving data that must be displayed on display screen 308. In this non-limiting embodiment, if language processing system 200 determines that a response to utterance 304 only requires an audio response, display screen may not turn on—one or more speakers would merely play the audio received from language processing system 200. In some embodiments, display screen will turn on in response to receiving any content from language processing system 200.

Continuing the above example, in response to detecting a wakeword (e.g., "Alexa"), portable electronic device 306 may package and send audio data representing utterance 304 to language processing system 200 via network 230. Language processing system 200 may then be configured to perform exemplary process 310, which may begin at step 312. At step 312, first audio data representing utterance 304 may be received. However, in some embodiments, instead of receiving audio data, text data may be received by language processing system 200. For example, an individual may type in a command/request into portable electronic device 306, which may then be sent to natural language processing system 200. The aforementioned is merely exemplary.

At step 314, first text data representing the first audio data may be generated. Upon receipt, the first audio data may be provided to an automatic speech recognition ("ASR") system capable of performing automatic speech recognition processing. The ASR system, as described in greater detail above in connection with FIG. 2A, may perform speech-to-text processing to the first audio data to generate first text data representing the first audio data.

At step 316, an intent of the utterance may be determined. After the first text data is generated, the text data may be provided to a NLU system to perform NLU processing to the text data. The NLU system may be similar to NLU 260 described above in connection with FIG. 2A and the same description applies herein. The NLU processing may use the language model(s) associated with the first user account in an attempt to determine an intent of utterance 304. For example, the NLU system may parse the text data into grammatical objects to determine the portions of the utterance associated with nouns, verbs, prepositions, etc. After this occurs, the grammatical objects may be used to generate a ranked list of intent hypothesis that the utterance may correspond to. The NLU system may determine one or more domains, which may also be referred to as categories that may be capable of handling the intent of the utterance. For example, utterance 304, "Alexa—What is the weather?," may be identified by a Weather domain as possibly being able to handle the corresponding request. For instance, the NLU system may identify that the word "What" may be a recognized intent as being an invocation word associated with the weather domain, and may use various sample utterances and invocation phrases associated with the weather domain to determine an intent of the utterance.

At step 318, second text data representing an answer or response to utterance 304 may be received. In one embodiment, text data representing a response may be generated by language-processing system 200. For instance, the NLU system and/or functionalities system may be employed to determine contextual features of a response to be generated, and may generate the corresponding text data representing that response. For example, language processing system 200 may determine the correct response to "Alexa—What is the weather?," may be the current weather. In this non-limiting embodiment, language processing system may receive text representing the current weather.

At step 320, second audio data representing the second text data may be generated. The text data may then be provided to TTS system 264, which may generate audio data representing the text data, which may then be sent to the requesting device. Language processing system 200 may, for instance, include a text-to-speech ("TTS") system. Upon the second text data being determined, the TTS system may be provided with the second text data, and may perform text-to-speech processing to the second text data to generate second audio data representing the second text data.

At step 322 video data representing an answer or response to utterance 304 may be received. In one embodiment, video data representing a response may be generated by language-processing system 200. For example, language processing system 200 may determine the correct response to "Alexa— What is the weather?," may be images showing the current weather forecast. In this non-limiting embodiment, language processing system may receive a video including images showing the weather forecast.

At step 324, the second audio data may be sent to the requesting device. For example, the second audio data may be sent to portable electronic device 306, which in turn may output the second audio data. At step 326, the video data may be sent to the requesting device. For example, the video data may be sent to portable electronic device 306, which may in turn display the video data on display screen 308.

In some embodiments, the steps of process 310 may be either omitted or reordered. For example, video data may not be sent to portable electronic device 306

Figure 3B:
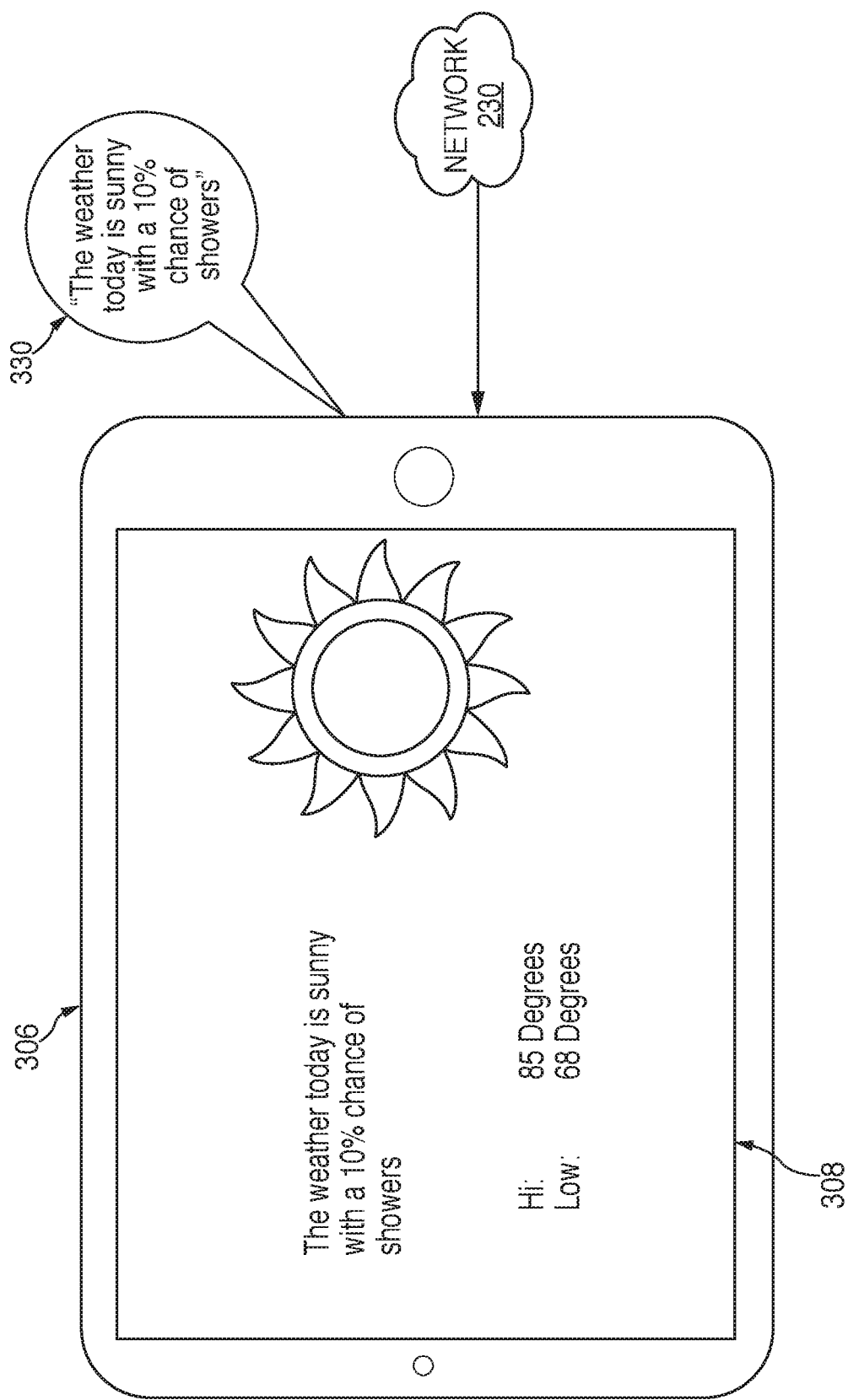
FIG. 3B is an illustrative diagram of an exemplary result from the use of the exemplary portable electronic device of FIGS. 1A and 1B, having a two-phase wakeword solution, interacting with the representative system architecture of FIGS. 2A and 2B, in accordance with various embodiments.

FIG. 3B is an illustrative diagram of an exemplary result from the use of the exemplary portable electronic device of FIGS. 1A and 1B, having a two-phase wakeword solution, interacting with the representative system architecture of FIGS. 2A and 2B, in accordance with various embodiments. Continuing the example above, portable electronic device has received both the video data and audio data from language processing system 200. In some embodiments, in response to receiving video data, portable electronic device 306 may display the visual content on display screen 308. In this non-limiting example, in response to utterance 304, display screen 308 is displaying the current weather. In some embodiments, in response to receiving audio data from language processing system 200, the audio data may be output by the one or more speakers as response 330. In some embodiments, the audio data and video data may be output simultaneously.

In some embodiments, after portable electronic device 306 has completed its response to utterance 304, portable electronic device 306 may return to standby mode. In these embodiments, display screen 308 may turn off. In some embodiments, portable electronic device 306 may wait a predetermined amount of time before returning to standby mode. For example, if images and text are displayed on display screen 308, portable electronic device 308 may wait to give user 302 enough time to read the response and look at the images. In some embodiments, the predetermined amount of time may vary based on the amount of content displayed. For example, if there is a lot of text to read on display screen 308, more time may be allotted before portable electronic device 306 changes modes from active to standby mode. On the other hand, if there is very little or nothing to read or look at, display screen 308, less time may be allotted before portable electronic device 306 changes modes from active to standby mode.

Figure 4:
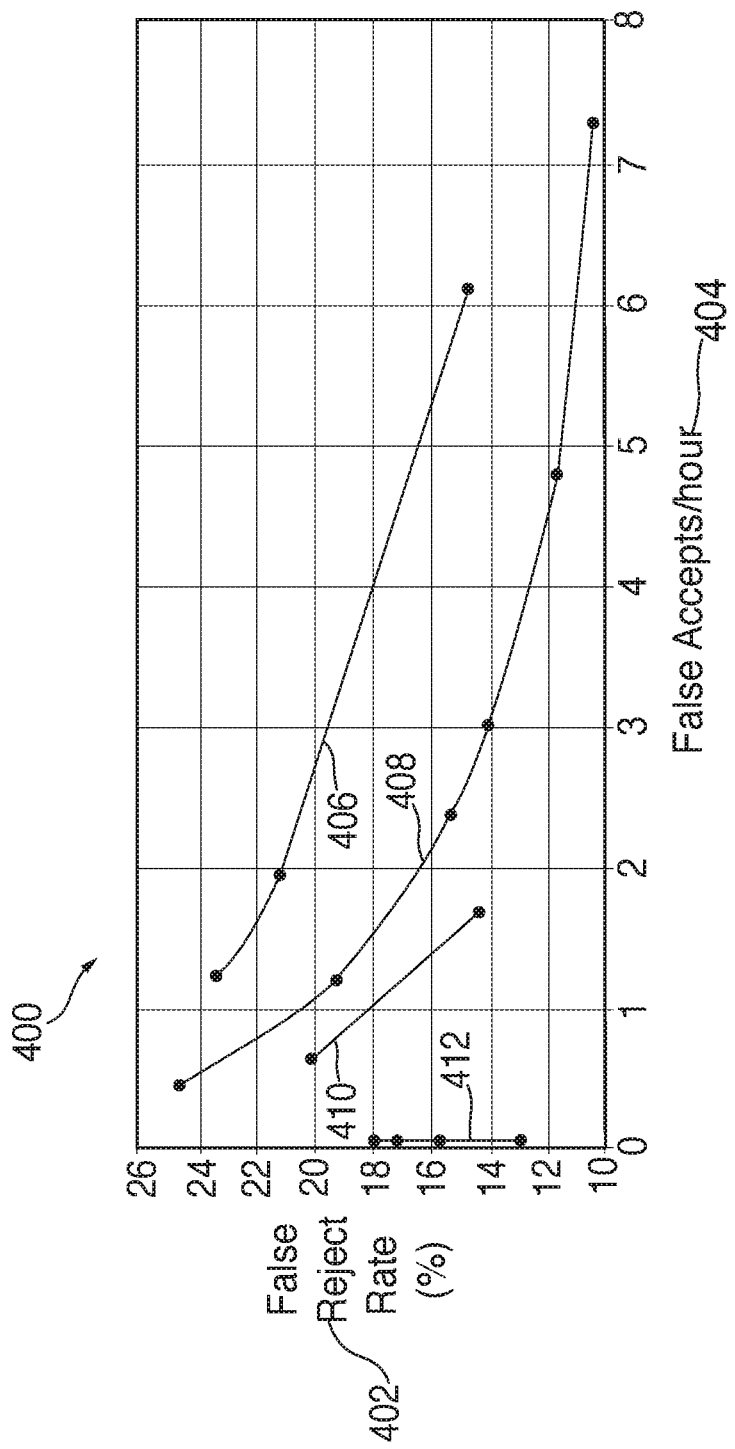
FIG. 4 is an illustrative diagram of an exemplary receiver operating characteristic ("ROC") curve showing some of the potential benefits of a two-phase wakeword solution in accordance with various embodiments.

FIG. 4 is an illustrative diagram of an exemplary receiver operating characteristic ("ROC") curve 400 showing some of the potential benefits of a two-phase wakeword solution. In some embodiments ROC curve 400 may demonstrate the tradeoff between sensitivity and specificity. In FIG. 4, ROC curve 400 plots four different wakeword sensory models on a diagram showing the relation between False Reject Rate 402 ("FRR") and False Accepts/Hour 404 ("FAH"). In some embodiments, FRR 402 may refer to the rate at which a portable electronic device may incorrectly determine that a wakeword is not present within a received digital signal. For example, if a user stated "Alexa, what is the weather?" and the wakeword was "Alexa," a wakeword is present in a digital signal representing the user's statement. If, for example, a portable electronic device determined that no wakeword was present in the digital signal representing the user's statement, than the portable electronic device would have falsely rejected an utterance for not having a wakeword. The portable electronic device described herein may be similar to portable electronic device 100A described above in connection with FIG. 1A and portable electronic device 100B described above in connection with FIG. 1B and the same descriptions apply.

FAH 404, may, in some embodiments, refer to the number of instances where a portable electronic device falsely accepts a digital signal per hour. A false accept, in some embodiments, may refer to the portable electronic device determining a wakeword is present in a digital signal when a wakeword is not present. For example, if a user stated "Hey John, how are you today?" and the wakeword was "Amazon," no wakeword was present in a digital signal representing the user's statement. If, for example, the portable electronic device determined that a wakeword is present, than the portable electronic device would have falsely accepted an utterance for having a wakeword.

ROC curve 400, in some embodiments, may show four different wakeword sensory models—first wakeword sensory model 406, second wakeword sensory model 408, third wakeword sensory model 410, and fourth wakeword sensory model 412. First wakeword sensory model 406, second wakeword sensory model 408, and third wakeword sensory model 410 (collectively "one-phase sensory models"), in some embodiments, are all one-phase wakeword solutions. As shown in FIG. 4, in order to decrease FRR 402, the one-phase sensory models accept more utterances that may have a wakeword. Thus, a tradeoff in one-phase sensory models, as shown in FIG. 4, is that there is a coupling or linking between FRR 402 and FAH 404. This means that as FRR 402 is decreased, there is an increase in FAH 404. Additionally, if there is a decrease in FAH 404, there is an increase in FRR 402. Thus, in some embodiments, in order to decrease the number of times a user's use of the wakeword is rejected, one-phase sensor models may need to adjust their collective sensitivity. The adjustment in sensitivity may lead to more FAH 404.

In some embodiments, fourth wakeword sensory model 412 may be a two-phase solution similar to the two-phase solutions shown in FIGS. 1A and 1B. As shown by fourth wakeword sensory model 412 of ROC curve 400, a two-phase solution may allow the sensitivity of fourth wakeword sensory model 412 to be adjusted without having a negative effect on FAH 404. The two-phase solution may decouple or delink FRR 402 and FAH 404. This drastically improves the user experience by decreasing FRR 402 without sacrificing FAH 404. For example, if the portable electronic device has a two-phase solution similar to FIG. 1B, the portable electronic device may have a VAD, a pre-wakeword detection circuit, and a wakeword detection circuit. The VAD may act as a first filter, in some embodiments, only allowing digital signals containing human speech to reach the pre-wakeword detection circuit. The pre-wakeword detection circuit may act as a second filter, preventing some or most digital signals that do not have the wakeword present from reaching the wakeword detection circuit. This may be accomplished, in some embodiments, by analyzing the digital signals based on a predetermined threshold. The predetermined threshold may be set at a value that reduces FRR 402 while limiting FAH 404. By the time the digital signal is analyzed by the wakeword detection circuit, digital signals not containing human speech and most likely not having the wakeword are already filtered out. The VAD and pre-wakeword detection circuit filter the incoming digital signals such that the wakeword detection circuit can have a sensitivity that does not sacrifice FA/H 404. For example, FRR 402 may be less than 15% while maintaining a FAH 404 of less than 1 per hour. These percentages are merely exemplary. The VAD that can produce the curve shown in FIG. 4 may be similar to voice detection circuit 138A described above in connection with FIG. 1A and voice activity detection 138B described above in connection with FIG. 1B, both descriptions applying herein. The pre-wakeword detection circuit that can produce the curve shown in FIG. 4 may be similar to pre-wakeword detection circuit 174B described above in connection with FIG. 1B, and the same description applies. Wakeword detection circuit that can produce the curve shown in FIG. 4 may be similar to wakeword detection circuit 154A described above in connection with FIG. 1A and wakeword detection circuit 154B described above in connection with FIG. 1B, both descriptions applying herein. In some embodiments, the same filtering effect may be accomplished with either the VAD or pre-wakeword detection circuit being omitted. The numbers and specificity of ROC curve 400 is merely exemplary.

Figure 5:
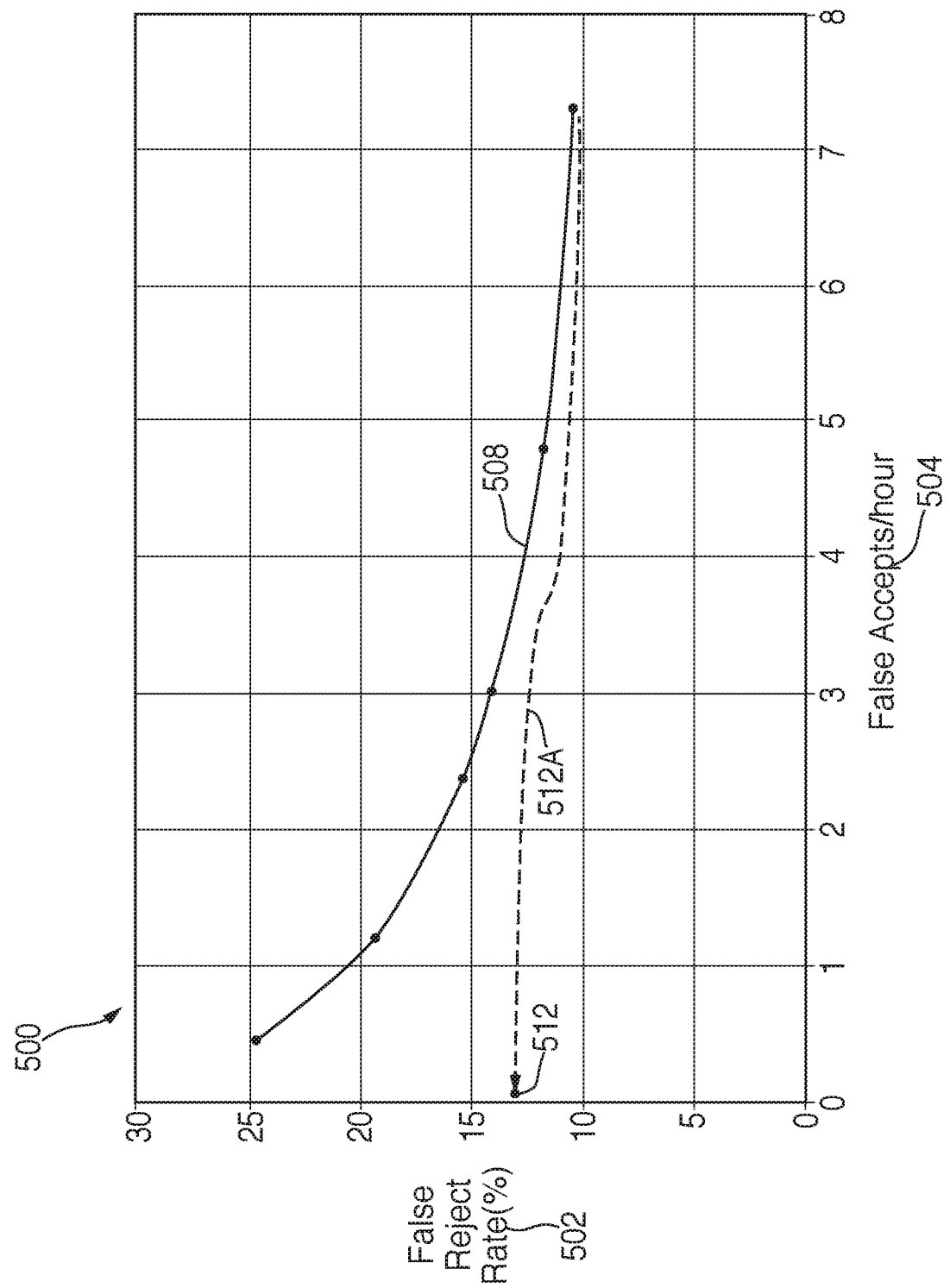
FIG. 5 is another illustrative diagram of an exemplary ROC curve showing some of the potential benefits of a two-phase wakeword solution in accordance with various embodiments.

FIG. 5 is another illustrative diagram of an exemplary ROC curve 500 showing some of the potential benefits of a two-phase wakeword solution. In some embodiments ROC curve 500 may demonstrate the tradeoff between sensitivity and specificity. In FIG. 5, ROC curve 500 plots two different wakeword sensory models on a diagram showing the relation between FRR 502 and FAH 504. As used herein, FRR 502 may be similar to FRR 402 described above in connection with FIG. 4, and the same description applies herein. Additionally, FAH 504, as used herein, may be similar to FAH 404 described above in connection with FIG. 4 and the same description applies herein.

ROC curve 500, in some embodiments, may show two different wakeword sensory models—first wakeword sensory model 508 and second wakeword sensory model 512. First wakeword sensory model 508, in some embodiments, is a one-phase wakeword solutions. As shown in FIG. 5, in order to decrease FRR 502, the one-phase sensory models accept more utterances that may have a wakeword. Thus, a tradeoff in one-phase sensory models, as shown in FIG. 5, is that there is a coupling or linking between FRR 502 and FAH 504. This means that as FRR 502 is decreased, there is an increase in FAH 504. Additionally, if there is a decrease in FAH 504, there is an increase in FRR 502. Thus, in some embodiments, in order to decrease the number of times a user's use of the wakeword is rejected, one-phase sensor models may need to adjust their collective sensitivity. The adjustment in sensitivity may lead to more FAH 504. In some embodiments, first wakeword sensory model 508 may be similar to first wakeword sensory model 406, second wakeword sensory model 408, and third wakeword sensory model 410 (collectively "one-phase sensory models") described above in connection with FIG. 4 and the same descriptions apply herein.

In some embodiments, second wakeword sensory model 512 may be a two-phase solution similar to the two-phase solutions shown in FIGS. 1A and 1B. As shown by second wakeword sensory model 512 of ROC curve 500, a two-phase solution may allow the sensitivity of second wakeword sensory model 512 to have a low FRR 502 without increasing FAH 504. For illustrative purposes, comparison line 512A demonstrates how a two-phase solution can have a low FRR 502 while maintaining a low FAH 504. Second sensory model 512 may be similar to fourth sensory model 412 described above in connection with FIG. 4 and the same description applies. The numbers and specificity of ROC curve 400 is merely exemplary.

The various embodiments of the invention may be implemented by software, but may also be implemented in hardware, or in a combination of hardware and software. The invention may also be embodied as computer readable code on a computer readable medium. The computer readable medium may be any data storage device that may thereafter be read by a computer system.

The above-described embodiments of the invention are presented for purposes of illustration and are not intended to be limiting. Although the subject matter has been described in language specific to structural feature, it is also understood that the subject matter defined in the appended claims is not necessarily limited to the specific features described. Rather, the specific features are disclosed as illustrative forms of implementing the claims.

What is claimed is:
1. An electronic device comprising:
   a microphone operable to receive an analog audio input signal;
   a low-power circuit that utilizes less power to operate while active than power to operate the electronic device, the low power circuit comprising:
     an analog-to-digital converter operable to:
       receive the analog audio input signal; and
       convert the analog audio input to a digital signal;
     a voice activity detector operable to:
       receive the digital signal from the analog-to-digital converter;

analyze the digital signal to determine that the digital signal includes a digital representation of spoken words; and output a first switch signal when the digital representation of the spoken words are present in the digital signal;

a first memory buffer circuit operable to:
receive the digital signal from the analog-to-digital converter; and
output the digital signal in response to the voice activity detector determining that the digital signal includes a digital representation of spoken words; and a medium-power circuit that utilizes more power to operate than the low-power circuit, but less than the power to operate the electronic device, and that operates in standby mode until it receives an interrupt signal, the medium-power circuit comprising:
an activation circuit that activates the medium-power circuit in response to receiving the first switch signal from the low-power circuit;
a wakeword detection circuit operable to:
receive the digital signal from the low-power circuit; and
analyze the digital signal to determine that a digital representation of a wakeword is present in the digital signal, the wakeword being any keyword or phrase that, when detected, signals that the electronic device should be activated and results in the medium power circuit outputting the digital signal to a language processing system that analyzes the digital signal; and
a second memory buffer circuit operable to:
receive the digital signal from the low-power circuit; and
output the digital signal in response to the wakeword detection circuit determining a digital representation of the wakeword is present in the digital signal.

2. The electronic device of claim 1, the low-power circuit further comprising:
a pre-wakeword detection circuit that operates in standby mode until the first switch signal is received, the pre-wakeword detection circuit operable to:
analyze the digital signal to determine that the digital signal includes a digital representation of the wakeword beyond a predetermined threshold, the predetermined threshold being set to a value such that the rate of false acceptances of digital representations of the wakeword per hour is limited while reducing the percentage of false rejections of digital representations of the wakeword; and
provide a second signal that activates the medium-power circuit; and a pre-wakeword memory buffer circuit operable to:
receive the digital signal from the first memory buffer circuit; and
output the digital signal in response to the pre-wakeword detection circuit determining beyond a predetermined threshold that a digital representation of the wakeword is present in the digital signal.

3. The electronic device of claim 2, the pre-wakeword detection circuit being a digital signal processor and the predetermined threshold being set by varying the operational characteristics of the digital signal processor.

4. The electronic device of claim 1, further comprising:
communications circuitry operable to:
output the digital signal to a language processing system in response to the digital representation of the wakeword being present in the digital signal;
receive a third signal that causes the electronic device to go from standby mode to active mode;
receive content responsive to a request included within the digital signal; and
a display screen operable to:
remain in standby mode until a second interrupt signal is received;
display the content; and
return to standby mode after displaying the content.

5. An electronic device comprising:
a microphone operable to receive an audio input;
a first circuit that utilizes less power to operate while active than power to operate the electronic device, the first circuit comprising:
a voice activity detector operable to:
receive the audio input;
analyze the audio input to determine that a digital representation of spoken words are present in the audio input; and
output a first signal in response to determining that the digital representation of spoken words are present in the audio input; and
a second circuit that utilizes more power than the first circuit but less than the power to operate the electronic device, and that operates in standby mode until it receives an interrupt signal, the second circuit comprising:
an activation circuit that activates the second circuit in response to receiving the first signal from the first circuit;
a wakeword detection circuit operable to:
receive the audio input from the first circuit; and
analyze the audio input to determine that a digital representation of a wakeword is present in the audio input.

6. The electronic device of claim 5, the first circuit further comprising:
a sub-circuit comprising:
a pre wakeword detection circuit operable to:
analyze the audio input to determine that the digital signal comprises a digital representation of the wakeword beyond a predetermined threshold; and
provide a second signal that activates the second circuit.

7. The electronic device of claim 6, the predetermined threshold being set to a value such that an utterance that comprises a digital representation of the wakeword is rejected less than 15% of instances where utterances comprise a digital representation of the wakeword.

8. The electronic device of claim 6, wherein the sub-circuit is configured to operate in a standby mode until the sub-circuit receives the first signal.

9. The electronic device of claim 5, the first signal being an interrupt signal that causes the second circuit to stop any action the second circuit is performing at the time the second circuit receives the interrupt signal.

10. A system comprising:
an electronic device comprising:
a microphone operable to receive an audio input;
a first circuit that utilizes less power to operate while active than power to operate the electronic device, the first circuit comprising:

a voice activity detector operable to:
  receive the audio input;
  analyze the audio input to determine that a digital representation of spoken words are present in the audio input; and
  output a first signal in response to determining that the digital representation of spoken words are present in the audio input; and
a second circuit that utilizes more power than the first circuit but less than the power to operate the electronic device, and that operates in standby mode until it receives an interrupt signal, the second circuit comprising:
  an activation circuit that activates the second circuit in response to receiving the first signal from the first circuit;
  a wakeword detection circuit operable to:
    receive the audio input from the first circuit; and
    analyze the audio input to determine that a digital representation of a wakeword is present in the audio input; and
    provide a third signal that results in the second circuit outputting the digital signal to a language processing system that analyzes the digital signal;
communications circuitry operable to output the audio input;
a display screen operable to display visual content; and
a speaker operable to output audio data; and
a language processing system comprising:
  memory;
  communications circuitry; and
  at least one processor operable to:
    receive, from the second circuit, the audio input;
    generate first text data representing the audio input;
    determine, using the first text data, an intent of the audio input is to receive an answer;
    receive second text data representing the answer;
    generate audio data representing the second text data; and
    output the audio data.

11. The system of claim 10, the first circuit further comprising:
  a sub-circuit comprising a pre wakeword detection circuit operable to:
    analyze the audio input to determine that the digital signal comprises a digital representation of the wakeword beyond a predetermined threshold; and
    provide a second signal that activates the second circuit.

12. The system of claim 11, the predetermined threshold being set to a value such that an utterance that comprises the wakeword is rejected less than 15% of instances where utterances comprise the wakeword.

13. The system of claim 12, the predetermined threshold being set at a value such that the rate at which an utterance that does not comprise the wakeword is accepted is at a rate larger than that accepted by the second circuit.

14. The system of claim 11, wherein the sub-circuit is configured to operate in a standby mode until the sub-circuit receives the first signal.

15. The system of claim 10, the display screen further operable to operate in standby mode until the second circuit receives an interrupt signal.

16. The system of claim 10, the display screen further operable to operate in standby mode until the second circuit determines the wakeword is present.

17. The system of claim 10, the display screen further operable to return to standby mode after displaying the visual content for a predetermined amount of time.

18. The system of claim 17, the predetermined amount of time being based on the visual content.

* * * * *